(12) United States Patent
Ballow et al.

(10) Patent No.: US 7,349,877 B2
(45) Date of Patent: Mar. 25, 2008

(54) TOTAL RETURN TO SHAREHOLDER ANALYTICS

(75) Inventors: John J. Ballow, Eatons Neck, NY (US); Brian F. McCarthy, Atlanta, GA (US); Anthony J. Relvas, Ladera Ranch, CA (US)

(73) Assignee: Accenture Global Services GmbH (CH)

(*) Notice: Subject to any disclaimer, the term of this patent is extended or adjusted under 35 U.S.C. 154(b) by 114 days.

(21) Appl. No.: 11/072,354

(22) Filed: Mar. 2, 2005

(65) Prior Publication Data

US 2005/0209948 A1    Sep. 22, 2005

Related U.S. Application Data

(60) Provisional application No. 60/549,619, filed on Mar. 2, 2004.

(51) Int. Cl.
*G06Q 40/00* (2006.01)
(52) U.S. Cl. ..................... 705/36 R; 705/37
(58) Field of Classification Search ............ 705/7, 705/11, 35–36, 36 R, 37
See application file for complete search history.

(56) References Cited

U.S. PATENT DOCUMENTS

| | | | |
|---|---|---|---|
| 6,154,731 A | | 11/2000 | Monks et al. |
| 2002/0013720 A1* | | 1/2002 | Ozono et al. ............. 705/7 |
| 2004/0064331 A1 | | 4/2004 | Mayer et al. |
| 2004/0073441 A1 | | 4/2004 | Heyns et al. |
| 2004/0073477 A1 | | 4/2004 | Heyns et al. |
| 2004/0249731 A1 | | 12/2004 | Sonnek et al. |
| 2005/0004832 A1 | | 1/2005 | Ostergard et al. |
| 2005/0209942 A1 | | 9/2005 | Ballow et al. |
| 2005/0209943 A1 | | 9/2005 | Ballow et al. |
| 2005/0209944 A1 | | 9/2005 | Ballow et al. |
| 2005/0209945 A1 | | 9/2005 | Ballow et al. |
| 2005/0209946 A1 | | 9/2005 | Ballow et al. |
| 2005/0209948 A1* | | 9/2005 | Ballow et al. ............. 705/36 |

OTHER PUBLICATIONS

Alexa Michl et al., The CFO Project, Competitive Financial Operations, "*Watching Goodwill Go Bad*"; 14 pages, Oct. 1, 2003; info@mriresearch.com.

(Continued)

*Primary Examiner*—Hani M. Kazimi
*Assistant Examiner*—Thu Thao Havan
(74) *Attorney, Agent, or Firm*—Brinks Hofer Gilson & Lione

(57) ABSTRACT

A computer-implemented method for analyzing the relative performance of a business unit includes: receiving financial data about the business unit; determining NOPLAT, revenue, capital charge, and invested capital values for the business unit at a first time and a second time from the financial data; determining at least two data points including a first component indicative of NOPLAT/revenue and a second component indicative of revenue/capital charge for the business unit, the at least two data points indicative of values determined at one of the first time and the second time, respectively; and displaying the at least two data points, a first indicia for each data point indicative of the capital value, a second indicia indicative of a spread percentage, and a third indicia indicative of a relationship between the at least two data points between the first time and the second time.

25 Claims, 21 Drawing Sheets

OTHER PUBLICATIONS

Wlodek Zadrozny, IBM Research Report, "*Text Analytics for Asset Valuation*", IBM Research Division, Thomas J. Watson Research Center, Aug. 27, 2004, Computer Science.

John J. Ballow et al., Blackwell Synergy, "*Future Value: The $7 Trillion Challenge*" Journal of Applied Corporate Finance, vol. 16, Issue 1, p. 71, Winter 2004.

John Ballow, et al., A New Paradigm for Managing Shareholder Value, Accenture Institute for High Performance Business, Jul. 2004; 24 pages.

John J. Ballow, et al., Accenture Institute for High Performance Business, "*New Concepts in Value-Based Management*", TRS Mapping and Total Economic Profit, Research Note, Intangible Assests and Future Value, Issue Two, May 10, 2004.

John J. Ballow et al., "*Enhanced Business Reporting*", A formal joint proposal to the AICPA from Accenture LLP & AssetEconomics, Inc., Oct. 2004.

John J. Ballow et al., "*Managing for shareholder value: intangibles, future value and investment decisions*", Journal of Business Strategy, vol. 25, No. 3, 2004, printed from website www.ingentaconnec.com/content/mcb, 2 pages, Jan. 29, 2007.

Esa Mäkeläinen, Universitas Oeconomica Helsingiensis, "*Econmic Value Added as a management tool*", Sep. 9, 1998, 49 pages; http://www.evanomics.com/evastudy.shtml.

Brian F. McCarthy, "*Instant gratification or long-term value? A lesson in enhancing shareholder wealth*", Journal of Business Strategy, vol. 25, No. 4, 2004, printed from website http://ingentaconnect.com/content/mcb, 2 pages, Jan. 29, 2007.

\* cited by examiner

Total Return to Shareholders Statement

Assumptions

| Target Input Variables | | |
|---|---|---|
| NOPLAT Growth | 10.00% | Targeted growth rate determined by planning process |
| Terminal Growth (GDP) | 3.50% | GDP terminal growth based on historical analysis-US Dept of Commerce |
| WACC | 9.06% | WACC represents the minimum return that must be generated |
| TRS | 10.00% | Targeted return to shareholders; minimum % = WACC |
| Dividends Per Share | $ 0.80 | Dividend payout reduces invested capital = capital returned to shareholders |

| | Historical Performance | | | | Target Setting Analysis | | | |
|---|---|---|---|---|---|---|---|---|
| Current Value | 2001 | 2002 | 2003 | Target | Variance | Adj Target | Variance | |
| Revenue | 10,744 | 11,596 | 13,181 | | 13,181 | | 13,181 | |
| - COGS (w/o Dep & Amort) | (7,924) | (8,388) | (9,186) | | (9,186) | | (9,186) | |
| + Operating Lease Expense | 333 | 443 | 499 | | 499 | | 499 | |
| - SG&A | (2,045) | (2,259) | (2,816) | | (2,816) | | (2,816) | |
| - Other Operating Expenses | - | - | - | | - | | - | |
| - Depreciation & Amortization Expense | (249) | (267) | (283) | | (283) | | (283) | |
| Adjusted EBIT | 859 | 1,126 | 1,395 | | 1,395 | | 1,395 | |
| + Amortization Expense | - | 2 | 8 | | 8 | | 8 | |
| EBITA | 859 | 1,128 | 1,403 | | 1,403 | | 1,403 | |
| Marginal Taxes on EBITA | (318) | (417) | (519) | | (519) | | (519) | |
| NOPLAT | 541 | 711 | 884 | 782 | 102 | | 884 | |
| + Operating Cash | 215 | 232 | 264 | | 264 | | 264 | |
| + Accounts Receivables | 339 | 364 | 410 | | 410 | | 410 | |
| + Inventory | 1,460 | 1,555 | 1,466 | | 1,466 | | 1,466 | |
| + Other Current Assets | 210 | 202 | 211 | | 211 | | 211 | |
| Operating Current Assets | 2,223 | 2,353 | 2,351 | | 2,351 | | 2,351 | |
| - Accounts Payable | (935) | (1,092) | (1,111) | | (1,111) | | (1,111) | |
| - Income Taxes Payable | (212) | (190) | (207) | | (207) | | (207) | |
| - Other Current Liabilities | (443) | (566) | (615) | | (615) | | (615) | |
| Non-Interest bearing Current Liabilities | (1,591) | (1,848) | (1,933) | | (1,933) | | (1,933) | |
| + Operating Working Capital | 632 | 506 | 418 | | 418 | | 418 | |
| + Net PPE | 1,359 | 1,448 | 1,505 | | 1,505 | | 1,505 | |
| + Implied Value of Operating Leases | 6,559 | 8,229 | 8,426 | | 8,426 | | 8,426 | |
| + Other Operating Assets | 106 | 348 | 317 | | 317 | | 317 | |
| - Other Operating Liabilities | (86) | (105) | (142) | | (142) | | (142) | |
| Invested Capital w/o Goodwill | 8,570 | 10,426 | 10,524 | | 10,524 | | 10,524 | |
| + Net Goodwill | 780 | 1,757 | 1,752 | | 1,752 | | 1,752 | |
| Invested Capital w/ Goodwill | 9,350 | 12,184 | 12,276 | 12,587 | (311) | | 12,276 | |
| Current Value | 5,239 | 7,846 | 9,974 | 8,631 | (1,343) | | 9,974 | |
| Operating Advantage | - | - | - | | - | | - | |
| Financing | | | | | | | | |
| Risk Free Rate | 5.03% | 3.96% | 4.33% | 3.96% | 0.37% | | 4.33% | |
| Market Risk Premium | 5.00% | 5.00% | 5.00% | 5.00% | - | | 5.00% | |
| Beta | 2 | 2 | 2 | 2 | (1) | | 1.61 | |
| Ke (Cost of Equity) | 15.33% | 15.36% | 12.38% | 15.36% | -2.98% | | 12.38% | |
| Kd | 6.69% | 5.62% | 5.99% | 5.62% | 0.37% | | 5.99% | |
| Tax Rate | 37.0% | 37.0% | 37.0% | 37.0% | - | | 37.00% | |
| Market Capitalization | 8,454 | 8,123 | 13,284 | 8,557 | 4,726 | | 13,284 | |
| Total Debt | 6,914 | 9,289 | 9,184 | 10,218 | (1,034) | | 9,184 | |
| Total Market Value | 15,368 | 17,412 | 22,467 | 18,775 | 3,692 | | 22,467 | |
| WACC (Weighted Average Cost of Capital) | 10.33% | 9.06% | 8.86% | 9.06% | -0.19% | | 8.86% | |
| Δ in CV due to Tax Rate Δ | | | | | | | | |
| Δ in CV due to Capital Structure Δ (WACC) | | 969 | 212 | - | 212 | | 212 | |
| Δ in CV due to Operations | | 1,639 | 1,916 | 785 | 1,131 | | 1,916 | |
| Change in Current Value Check | | - | - | (0) | 0 | | - | |

|  | Historical Performance | | | Target Setting Analysis | | |
|---|---|---|---|---|---|---|
| Enterprise Value | | | | | | |
| Enterprise Value | 15,368 | 17,412 | 22,467 | 18,775 | (3,692) | 22,467 |
| Market Value Added | 6,018 | 5,229 | 10,192 | 6,188 | 4,003 | 10,192 |
| Capital Charge | 966 | 1,103 | 1,088 | 1,140 | (52) | 1,088 |
| Economic Profit ($) | (425) | (393) | (204) | (358) | 154 | (204) |
| Return on Invested Capital (%) | 5.79% | 5.83% | 7.20% | 6.21% | 0.99% | 7.20% |
| Future Value | | | | | | |
| Future Value (Economic View displayed) | 10,129 | 9,566 | 12,493 | 10,144 | (2,349) | 12,493 |
| Operating Disadvantage | 6,218 | 7,069 | 3,803 | 6,448 | 2,645 | 3,803 |
| Expected Growth at GDP (as illustrative idex) | 2,684 | 4,942 | 6,508 | 5,436 | (1,072) | 6,508 |
| Future Value Premium (FV') | 1,228 | (2,446) | 2,182 | (1,740) | (3,922) | 2,182 |
| Market Benchmark Index Value (S&P 500) | 1,130 | 856 | 1,131 | 886 | 245 | 1,131 |
| Market Benchmark % Return (S&P 500) | | -24.29% | 32.19% | 3.50% | 28.69% | 32.19% |
| Future Value Indexed (FV') | | 11,358 | 12,295 | 10,402 | 1,892 | 12,295 |
| Adjusted Future Value of EP (FV' * WACC) | | 1,029 | 1,090 | 942 | 148 | 1,090 |
| EP + (EP + Adjusted Future Value of RONA) | | 636 | 886 | 584 | 302 | 886 |
| Total Economic Profit | | | | | | |
| Economic Profit | (425) | (393) | (204) | (358) | 154 | (204) |
| Invested Capital Charge | 966 | 1,103 | 1,088 | 1,140 | 189 | 1,088 |
| Economic Profit of Future Value (EPFV) | 1,047 | 866 | 1,107 | 919 | (34) | 1,107 |
| EP Finance (Dividends,WACC,D/E) | 38 | | | 34 | | |
| Total Economic Profit $ | 1,626 | 1,577 | 1,991 | 1,735 | 257 | 1,991 |
| Total Economic Profit % | | -3.03% | 26.29% | 10.00% | 16.29% | 26.29% |
| Total Return to Shareholders | | | | | | |
| Common Shares Outstanding | 464 | 473 | 499 | 473 | 26 | 499 |
| Share Price | 18.22 | 17.17 | 26.61 | 18 | 9 | 27 |
| Dividends Paid per share | 1 | (331) | | 0.80 | (1) | |
| TRS ($) attributable to Share Price | | 5,160 | | 8,557 | (3,397) | |
| TRS ($) attributable to Dividends | | | | 378 | (378) | |
| TRS ($) | 8,825 | 8,123 | 13,284 | 8,936 | 4,348 | 13,284 |
| TRS ($) Indexed | | 9,450 | 17,446 | 9,516 | 7,930 | 17,446 |
| TRS (%) Return attributable to Share Price Δ | | -5.76% | 54.98% | 5.34% | 49.64% | 54.98% |
| TRS (%) Return attributable to Dividends | | | | 4.66% | 4.66% | |
| TRS (%) | | -5.76% | 54.98% | 10.00% | 44.98% | 54.98% |
| TRS (%) Indexed | | 18.52% | 22.79% | 6.50% | 16.29% | 22.79% |

Fig. 5B

| 2003 | 2004 | 2005 | 2006 | 2007 | |
|---|---|---|---|---|---|
| TRS% | | | | | |
| 1.00 | 1.10 | 1.21 | 1.33 | 1.46 | ◄—610 |
| TRS $ (EQUITY + DIVIDENDS) | | | | | |
| $3,200 | $3,520 | $3,872 | $4,259 | $4,685 | ◄—612 |
| DIVIDENDS | | | | | |
| $200 | $210 | $221 | $232 | $243 | ◄—614 |
| EQUITY (MV) | | | | | |
| $3,000 | $3,310 | $3,652 | $4,028 | $4,442 | ◄—616 |
| DEBT | | | | | |
| $2,000 | $2,207 | $2,434 | $2,685 | $2,961 | ◄—618 |
| ENTERPRISE VALUE (EV) | | | | | |
| $5,000 | $5,517 | $6,086 | $6,713 | $7,403 | ◄—620 |
| ECONOMIC PROFIT OF CURRENT VALUE (EP OF CV) | | | | | |
| $750 | $825 | $908 | $998 | $1,098 | ◄—622 |
| FUTURE VALUE (FV) | | | | | |
| $4,250 | $4,692 | $5,175 | $5,715 | $6,305 | ◄—624 |
| ECONOMIC PROFIT | | | | | |
| $75 | $83 | $91 | $100 | $110 | ◄—626 |
| ECONOMIC PROFIT OF FUTURE VALUE (EP OF FV) | | | | | |
| $425 | $469 | $518 | $571 | $631 | ◄—628 |
| TOTAL ECONOMIC PROFIT | | | | | |
| $500 | $552 | $609 | $671 | $740 | ◄—630 |
| ANNUAL TRS $ CHANGE | | | | | |
| | $520 | $562 | $608 | $657 | ◄—632 |

GROWTH
10%  ⟵602

DIVIDEND %
5%  ⟵604

DEBT/EQUITY %
40%  ⟵606

Annual TRS $ Change = (TEP2 - TEP1)/WACC - Change in Debt + Dividends
Where TEP2 represents Total Economic Profit at end of period and TEP1 represents Total Economic Profit at beginning of period and assume WACC is constant over time

Fig. 6

| NOPLAT (Top Down) | 2001 | 2002 | 2003 | 2004 | 2005 | 2006 | 2007 | 2008 | Assumptions |
|---|---|---|---|---|---|---|---|---|---|
| Revenues | 10,744 | 11,596 | 13,181 | 14,341 | 15,488 | 16,898 | 18,503 | 20,446 | |
| - COGS (w/o Dep & Amort) | (7,924) | (8,388) | (9,186) | (10,182) | (10,997) | (11,998) | (13,137) | (14,517) | |
| (COGS as a % of Revenue) | 73.75% | 73.01% | 71.78% | 71.0% | 71.0% | 71.0% | 71.0% | 71.0% | |
| Gross Margin | 2,820 | 3,209 | 3,995 | 4,159 | 4,492 | 4,900 | 5,366 | 5,929 | |
| Next Year's Operating Lease Expense | 439 | 463 | 505 | 509 | 514 | 518 | 523 | 528 | |
| Cost of Debt | 6.69% | 5.62% | 5.99% | 5.99% | 5.99% | 5.99% | 5.99% | 5.99% | |
| Implied Value of Operating Leases | 6,559 | 8,229 | 8,426 | 8,494 | 8,570 | 8,647 | 8,725 | 8,804 | Growth based on "Operating Lease Growth" input |
| + Operating Lease Expense | 333 | 443 | 499 | 507 | 511 | 516 | 521 | 525 | |
| + Retirement Related Liabilities (RLL) Expense | - | - | - | - | - | - | - | - | |
| - SBU SG&A | (1,844) | (1,996) | (2,519) | (3,031) | (3,287) | (3,535) | (4,128) | (4,512) | PLUG amount based on COGS/Adjusted EBIT |
| - Corporate SG&A | (201) | (263) | (297) | (307) | (332) | (362) | (397) | (438) | 2001 - 2003: 3 year historical average |
| - Other Operating Expenses | - | - | - | - | - | - | - | - | |
| - Depreciation & Amortization Expense | (249) | (267) | (283) | 335 | 387 | 440 | 492 | 544 | |
| Adjusted EBIT | 859 | 1,126 | 1,395 | 1,663 | 1,771 | 1,959 | 1,854 | 2,048 | |
| Check | - | - | (0) | 0 | 0 | (0) | (0) | 0 | |
| + Amortization Expense | 0 | 2 | 8 | 9 | 9 | 10 | 11 | 12 | 2004-08 based on 2003 % of Revenue |
| EBITA | 859 | 1,128 | 1,403 | 1,671 | 1,781 | 1,969 | 1,865 | 2,061 | |
| Marginal Tax Rate | 40.00% | 40.00% | 40.00% | 36.5% | 36.5% | 36.5% | 36.5% | 36.5% | 2004 - 08 = Staples Rate |
| Marginal Taxes on EBITA | (344) | (451) | (561) | (610) | (650) | (719) | (681) | (752) | |
| Operating Profit (NOPLAT Growth) | 515 | 677 | 842 | 1,061 | 1,131 | 1,250 | 1,184 | 1,309 | |
| Operating Profit Margin (NOPLAT/Revenue) | 4.80% | 5.84% | 6.39% | 8.8% | 8.0% | 9.1% | 9.5% | 10.5% | |

Fig. 9

| | 2001 | 2002 | 2003 | 2004 | 2005 | 2006 | 2007 | 2008 | Assumptions |
|---|---|---|---|---|---|---|---|---|---|
| Free Cash Flow | | | | | | | | | |
| NOPLAT (Operating Profit after Taxes) | 515 | 677 | 842 | 1,061 | 1,131 | 1,250 | 1,184 | 1,309 | |
| + Dec (Inc) in Invested Capital | (34) | (2,840) | (92) | (481) | (290) | (255) | (215) | (184) | |
| = Free Cash Flow | (34) | (2,163) | 750 | 581 | 840 | 996 | 969 | 1,124 | |
| | 2001 | 2002 | 2003 | 2004 | 2005 | 2006 | 2007 | 2008 | |
| Common Stock Repurchase | | | | | | | | | |
| Outstanding Common Shares - beg. balance | | | | 499.2 | 499.2 | 499.2 | 499.2 | 499.2 | |
| Common Shares to Repurchase | | | 499.19 | 0.0 | 0.0 | 0.0 | 0.0 | 0.0 | |
| Outstanding Common Shares - ending balance | | | | 499.2 | 499.2 | 499.2 | 499.2 | 499.2 | |
| | 2001 | 2002 | 2003 | 2004 | 2005 | 2006 | 2007 | 2008 | |
| Dividends Payable | | | | | | | | | |
| Dividend Payable per quarter per share | | | | $0.20 | $0.20 | $0.20 | $0.20 | $0.20 | |
| Annual Dividend Payout per share | | | | $0.80 | $0.80 | $0.80 | $0.80 | $0.80 | |
| Total Dividend Payout (millions) | | | | $399.35 | $399.35 | $399.35 | $399.35 | $399.35 | |
| Payout Ratio as a % of FCF available | | | | 68.8% | 47.5% | 40.1% | 41.2% | 35.5% | |
| | 2001 | 2002 | 2003 | 2004 | 2005 | 2006 | 2007 | 2008 | |
| Free Cash Flow Valuation | | | | | | | | | |
| Terminal Value | | | 13,479 | 10,434 | 15,099 | 17,892 | 17,409 | 20,207 | |
| Discount Rate | | | 1.000 | 0.920 | 0.846 | 0.778 | 0.715 | 0.658 | |
| Discounted Free Cash Flow | | | 750 | 534 | 711 | 775 | 693 | 740 | |
| Discounted Terminal Value | | | 13,479 | 9,596 | 12,771 | 13,919 | 12,455 | 13,296 | |
| Expected Firm Value | | | 14,229 | 10,880 | 14,766 | 16,688 | 15,918 | 17,498 | |
| Market Value of Book Debt | | | 758 | 835 | 921 | 1,015 | 1,119 | 1,233 | 4-yr CAGR (00-03) |
| Equity | | | 13,471 | 10,045 | 13,845 | 15,673 | 14,799 | 16,265 | |
| Expected Share Price | | | $26.99 | $20.12 | $27.74 | $31.40 | $29.65 | $32.58 | |

Fig. 11

| TRS Targets | 2001 | 2002 | 2003 | 2004 | 2005 | 2006 | 2007 | 2008 | |
|---|---|---|---|---|---|---|---|---|---|
| WACC | | 8.73% | 8.73% | | | | | | |
| Cost of Debt | | | 5.99% | 3.60% | 3.60% | 3.60% | 3.60% | 3.60% | |
| Cost of Equity | | | 12.28% | | | | | | |
| Current Market Value | | | 22,467 | | | | | | |
| Projected Market Value | | | | 8.90% | 9.08% | 9.28% | 9.48% | 9.69% | VERIFY VALUATION METHOD |
| | | | | 24,429 | 26,562 | 28,881 | 31,403 | 34,145 | EV grows at WACC |
| | | | | 8.73% | 8.73% | 8.73% | 8.73% | 8.73% | |
| Market Value of Book Debt | 0.408761 | | 9,184 | 9,533 | 9,896 | 10,273 | 10,664 | 11,069 | Required g in D = |
| ST & LT Debt + Operating Leases | | | | 3.81% | 3.81% | 3.81% | 3.81% | 3.81% | |
| | | | | 39.02% | 37.26% | 35.57% | 33.96% | 32.42% | |
| Market Value of Equity | | | 13,284 | 14,915 | 16,747 | 18,804 | 21,113 | 23,706 | |
| | | | 40.88% | 61.05% | 63.05% | 65.11% | 67.23% | 69.43% | |
| | | | 59.12% | 12.28% | 12.28% | 12.28% | 12.28% | 12.28% | |
| Dividends | | | | 399 | 399 | 399 | 399 | 399 | TRS = Ke returns |
| Total TRS $$$$$ | | | 13,284 | 15,314 | 17,146 | 19,203 | 21,513 | 24,106 | |
| | | | | | | | | | |
| Growth in TRS $$$$ (YOY Δ) | | | | 24,448 | 26,643 | 29,076 | 31,777 | 34,776 | |
| | % | | | 8.89% | 9.06% | 9.21% | 9.37% | 9.52% | |
| | | | | | 11.96% | 12.00% | 12.03% | 12.05% | Should equal Ke |
| Equity Share Price Target | | | | 5,781 | 16,666 | 18,609 | 20,739 | 23,076 | Required g in E = Ke - dividends |
| | | | | | | | | | |
| | | | | $11.58 | $33.39 | $37.28 | $41.55 | $46.23 | |

| TRS Targets | | | | | | | | | |
|---|---|---|---|---|---|---|---|---|---|
| FV/CV Analysis Results | 2001 | 2002 | 2003 | 2004 | 2005 | 2006 | 2007 | 2008 | |
| Market Capitalization | | | 13,471 | 10,045 | 13,845 | 15,673 | 14,799 | 16,265 | |
| Projected Debt | | | 9,184 | 9,329 | 9,491 | 9,662 | 9,843 | 10,036 | = Growth in Market Debt + Value of Implied Leases |
| Projected Enterprise Value | | | | 19,374 | 23,336 | 25,335 | 24,642 | 26,302 | = Market Capitalization + Projected Debt |
| Projected Current Value | | | | 12,154 | 12,949 | 14,321 | 13,563 | 14,987 | |
| Projected Future Value | | | | 7,219 | 10,386 | 11,014 | 11,080 | 11,315 | |
| Ratio Current Value | | | | 63% | 55% | 57% | 55% | 57% | |
| Ratio Future Value | | | | 37% | 45% | 43% | 45% | 43% | |

Fig. 12

| Ratio Analysis | 2001 | 2002 | 2003 | 2004 | 2005 | 2006 | 2007 | 2008 | |
|---|---|---|---|---|---|---|---|---|---|
| Historical Earnings | 265 | 446 | 490 | | | | | | Sourced from Staples Income Statement |
| Earnings/NOPLAT Multiple | 0.51 | 0.66 | 0.58 | 0.59 | 0.59 | 0.59 | 0.59 | 0.59 | IS earnings vs. NOPLAT multiple - 3 yr historical avg |
| Revenue/Invested Capital | 1.22 | 1.00 | 1.12 | 1.17 | 1.24 | 1.33 | 1.43 | 1.55 | |
| Capital Charge | 891 | 1,032 | 1,024 | 1,066 | 1,091 | 1,113 | 1,132 | 1,148 | |
| Revenue/Capital Charge | 12.06 | 11.23 | 12.87 | 13.46 | 14.19 | 15.18 | 16.34 | 17.81 | |
| Future Value/Invested Capital | | | | 0.59 | 0.83 | 0.86 | 0.85 | 0.86 | |
| Revenue Growth | | 7.93% | 13.67% | 8.80% | 8.00% | 9.10% | 9.50% | 10.50% | |
| Capital Growth | | 32.30% | 0.79% | 4.10% | 2.38% | 2.04% | 1.69% | 1.42% | |
| Spread | -4.27% | -3.06% | -1.55% | -0.04% | 0.32% | 1.07% | 0.40% | 1.22% | |
| Economic Profit (Spread * Invested Capital) | (375) | (356) | (182) | (5) | 39 | 137 | 52 | 160 | |
| Economic Profit (NOPLAT - (IC*WACC)) | (375) | (356) | (182) | (5) | 39 | 137 | 52 | 160 | |
| Economic Profit Check | - | - | - | 0 | (0) | - | - | - | |
| Sustainable Growth | | | | -5.97% | -2.15% | -2.62% | -1.96% | -2.83% | g = -(NOPLAT - (FV/(WACC)))/FV |
| Future Value Check | | | | - | - | - | - | - | FV = NOPLAT/(WACC-g) |
| Dividends per Share | | | | $0.80 | $0.80 | $0.80 | $0.80 | $0.80 | |
| Total Return to Shareholders (TRS) | | | | -22.47% | 41.81% | 16.09% | -3.03% | 12.61% | |

Fig. 13

| Summary | 2001 | 2002 | 2003 | 2004 | 2005 | 2006 | 2007 | 2008 | 5 Yr CAGR |
|---|---|---|---|---|---|---|---|---|---|
| Revenue | 10,744 | 11,596 | 13,181 | 14,341 | 15,488 | 16,898 | 18,503 | 20,446 | 9.18% |
| Operating Profit (NOPLAT) | 515 | 677 | 842 | 1,061 | 1,131 | 1,250 | 1,184 | 1,309 | 9.22% |
| Invested Capital w/ Goodwill | 8,794 | 11,634 | 11,726 | 12,207 | 12,497 | 12,752 | 12,968 | 13,152 | 2.32% |
| Return on Invested Capital | 5.86% | 5.82% | 7.18% | 8.69% | 9.05% | 9.81% | 9.13% | 9.95% | 6.7% |
| Capital Turns | 1.22 | 1.00 | 1.12 | 1.17 | 1.24 | 1.33 | 1.43 | 1.55 | |
| Projected Current Value | | | | 12,154 | 12,949 | 14,321 | 13,563 | 14,987 | |
| Projected Future Value | | | | 7,219 | 10,386 | 11,014 | 11,080 | 11,315 | |
| Expected Share Price (FCF Valuation) | | | $26.99 | $20.12 | $27.74 | $31.40 | $29.65 | $32.58 | 3.8% |
| Price/Earnings Ratio (P/E) | | | | 16.18 | 20.93 | 21.42 | 21.36 | 21.24 | |
| Earnings per Share (EPS) | | | | $1.24 | $1.33 | $1.47 | $1.39 | $1.53 | |
| Total Return to Shareholders (TRS) | | | | -22.47% | 41.81% | 16.09% | -3.03% | 12.61% | |

Fig. 14

TOTAL RETURN TO SHAREHOLDER ANALYTICS

RELATED APPLICATIONS

This application claims the benefit of the filing date under 35 U.S.C. §119(e) of Provisional U.S. Patent Application. Ser. No. 60/549,619, filed Mar. 2, 2004, which is hereby incorporated by reference. This application is related to U.S. application Ser. No. 11/072,351 filed Mar. 2, 2005, U.S. application Ser. No. 11/072,565 filed Mar. 2, 2005, U.S. application Ser. No. 11/072,566 filed Mar. 2, 2005, U.S. application Ser. No. 11/072,567 filed Mar. 2, 2005, and U.S. application Ser. No. 11/072,895 filed Mar. 2, 2005.

COPYRIGHT NOTES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright© 2005, Accenture, All Rights Reserved.

BACKGROUND

1. Technical Field

The present invention relates generally to business performance management, and more particularly to a system and method for evaluating a company's performance based on the decomposition and mapping of total return to shareholders.

2. Background Information

Business performance management (BPM), also known as Enterprise performance management (EPM), relates to the execution and monitoring of the performance of various components of a company's business. BPM, sometimes referred to as the next generation of business intelligence (BI), focuses on business processes such as planning and forecasting and helps businesses discover efficient use of their business units, financial, human, and material resources. Typically, BPM systems consolidate data from various sources, and provide functions for querying and analyzing the data and putting the results into practice.

BPM enhances business processes by creating better feedback loops that allow for the continuous, real-time review of information to help identify and eliminate problems before they grow. For example, forecasting capabilities may help the company take corrective action in time to meet earnings projections. BPM may also be useful in risk analysis and predicting outcomes of merger and acquisition scenarios, as well as planning to overcome potential problems.

BPM provides key performance indicators (KPI), or performance metrics, that help companies monitor efficiency of projects and employees against operational targets. These metrics/KPI may be used to assess the present state of the business and to prescribe a course of action. For example, BPM systems have been used to analyze: New customers acquired; Status of existing customers; Attrition of customers; Turnover generated by segments of the Customers; Outstanding balances held by segments of customers and terms of payment; Collection of bad debts within customer relationships; Demographic analysis of individuals (potential customers) applying to become customers, and the levels of approval, rejections and pending numbers; Delinquency analysis of customers behind on payments; and Profitability of customers by demographic segments and segmentation of customers by profitability. Regardless of the type of analysis a BPM system may be used for, BPM systems must acquire metric/KPI that is consistent, correct, and timely available.

Despite the great benefits many BPM systems provide, these systems are only as powerful as the metrics/KPI used to benchmark business performance. Unfortunately, there is a disconnect in traditional BPM systems between the financial performance metrics companies use in analyzing business performance and the ability to create and sustain high performance results in their execution over time. This disconnect arises because most companies take an internal approach to evaluating their business performance using performance metrics such as Earnings per Share (EPS), Return on Net Assets (RONA), Earnings Before Interest, Taxes, Depreciation, and Amortization (EBITDA), Return on Investment Capital (ROIC), Economic Value Added (EVA), Cash Flow Return on Investment (CFROI), and the like. These metrics neglect the true drivers of sustainable shareholder value and instead only determine the operating performance for the current operating year. Essentially, these metrics only provide analysis of a company's current value, or the present value of the uniform perpetual earnings on assets currently held by the company.

This disconnect becomes even more apparent when analyzing companies such as biotech companies with a high percentage of future value, or the present value of company opportunities for investments in real assets that will yield more than the normal market rate of return. For example, traditional value management focuses on Net Operating Profit Less Adjusted Taxes (NOPLAT) as the only source of "Return" on Invested Capital. Because high future value firms have little or no NOPLAT, there is no accounting for the value created by these types of companies.

Companies attempt to solve this disconnect through the implementation of major new transactional systems or point solutions to specific problems, such as ERP systems and data warehouses. Although these solutions are good at tracking transactional data, they do not help a company plan for what may occur and track the key drivers to enable decision making. Point solutions are band-aides that don't address the real problem of proactively managing those aspects of business performance that contribute to sustainable shareholder value.

Other companies address the current problems with BPM by implementing a Balanced Scorecard or Executive Dashboard. Exemplary scorecards and dashboards include the Cognos® Metrics Manager and Cognos® Visualizer, provided by Cognos, Inc. of Ottawa, Canada, and the Hyperion Performance Scorecard, provided by Hyperion Solutions Corporation of Sunnyvale, Calif. These solutions attempt to capture the financial and non-financial drivers of value for the company. These solutions typically provide results that are useful and insightful. However, these solutions may not be integrated into the remaining BPM systems utilized by the company, and may not incorporate metrics reflective of the true drivers of shareholder values.

Accordingly, there is a need for software tools and information technology solutions to create an integrated capability to drive BPM strategy and value creation that accurately measures the key drivers of both current and future value from an external perspective as well as detail how these drivers interrelate.

BRIEF SUMMARY

In one aspect, a computer-implemented method for analyzing the relative performance of a business unit of a company is provided. The method may include: receiving financial data about the business unit; determining with a data processor NOPLAT, revenue, capital charge, and invested capital values for the business unit at least at a first time and a second time from the financial data; determining with the data processor at least two data points from the NOPLAT, revenue, capital charge, and invested capital values, each data point including a first component indicative of NOPLAT/revenue for the business unit and a second component indicative of revenue/capital charge for the business unit, the at least two data points indicative of values determined at one of the first time and the second time, respectively; and displaying, to advise a user of the performance of the business unit, the at least two data points, a first indicia for each data point indicative of the capital value, a second indicia indicative of a spread percentage, and a third indicia indicative of a relationship between the at least two data points between the first time and the second time.

In another embodiment, computer-implemented method for analyzing the relative performance of a business unit of a company, the method comprising: receiving financial data about the business unit; determining with a data processor spread percentage, future value, and invested capital values for the business unit at least at a first time and a second time from the financial data; determining with a data processor at least two data point from the spread percentage, future value, and invested capital values, each data point including a first component indicative of spread percentage for the business unit and a second component indicative of future value/invested capital for the business unit, the at least two data points indicative of values determined at one of the first time and the second time, respectively; and displaying, to advise a user of the performance of the business unit, the at least two data points, a first indicia for each data point indicative of the invested capital value and a second indicia indicative of a relationship between the at least two data points between the first time and the second time.

These and other embodiments and aspects of the invention are described with reference to the noted Figures and the below detailed description of the preferred embodiments.

BRIEF DESCRIPTION OF THE DRAWINGS

FIG. 5A is a diagram representative of a computer display of a first part of an exemplary calculation worksheet;

FIG. 5B is a diagram representative of a computer display of second part of an exemplary calculation of Total Economic Profit (TEP);

FIG. 6 is a diagram representative of an TRS calculation using the TEP performance metric;

FIG. 9 is an exemplary intermediate report for the analysis tool of FIG. 7;

FIG. 11 is another exemplary intermediate report for the analysis tool of FIG. 7;

FIG. 12 is another exemplary intermediate report for the analysis tool of FIG. 7;

FIG. 13 is another exemplary intermediate report for the analysis tool of FIG. 7;

FIG. 14 is an exemplary summary report for the analysis tool of FIG. 7;

DETAILED DESCRIPTION OF THE DRAWINGS AND THE PRESENTLY PREFERRED EMBODIMENTS

Figure 1A:
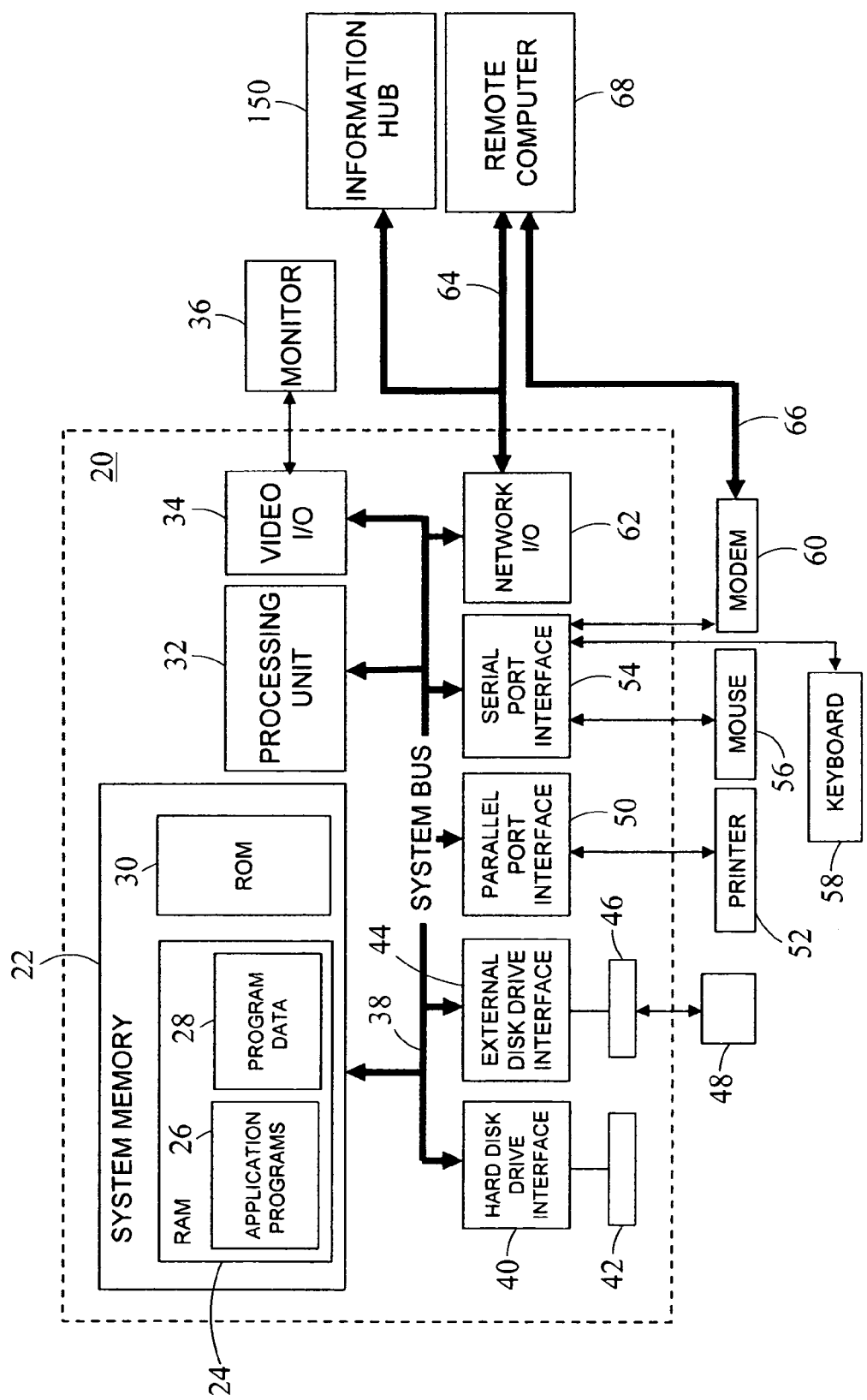
FIG. 1A is a diagram representative of an exemplary system for implementing one embodiment.

Referring now to the drawings, and initially to FIG. 1, an exemplary system for implementing the invention includes a general purpose computing device in the form of a computing environment 20, including a processing unit 32, a system memory 22, and a system bus 38, that couples various system components including the system memory 22 to the processing unit 32. The processing unit 32 may perform arithmetic, logic and/or control operations by accessing system memory 22. The system memory 22 may store information and/or instructions for use in combination with processing unit 32. The system memory 22 may include volatile and non-volatile memory, such as random access memory (RAM) 24 and read only memory (ROM) 30. A basic input/output system (BIOS) containing the basic routines that helps to transfer information between elements within the computer environment 20, such as during start-up, may be stored in ROM 30. The system bus 38 may be any of several types of bus structures including a memory bus or memory controller, a peripheral bus, and a local bus using any of a variety of bus architectures.

The computing environment 20 may further include a hard disk drive 42 for reading from and writing to a hard disk (not shown), and an external disk drive 46 for reading from or writing to a removable external disk 48. The removable disk may be a magnetic disk for a magnetic disk driver or an optical disk such as a CD ROM for an optical disk drive. The hard disk drive 42 and external disk drive 46 are connected to the system bus 38 by a hard disk drive interface 40 and an external disk drive interface 44, respectively. The drives and their associated computer-readable media provide non-volatile storage of computer readable instructions, data structures, program modules and other data for the computing environment 20. Although the exemplary environment described herein employs a hard disk and an external disk 48, it should be appreciated by those skilled in the art that other types of computer readable media which can store data that is accessible by a computer, such as magnetic cassettes, flash memory cards, random access memories, read only memories, and the like, may also be used in the exemplary operating environment.

A number of program modules may be stored on the hard disk, external disk 48, ROM 30 or RAM 24, including an operating system (not shown), one or more application programs 26, other program modules (not shown), and program data 28. One such application program may include the functionality as detailed below.

A user may enter commands and/or information, as discussed below, into the computing environment 20 through input devices such as mouse 56 and keyboard 58. Other input devices (not shown) may include a microphone (or other sensors), joystick, game pad, scanner, or the like. These and other input devices may be connected to the processing unit 32 through a serial port interface 54 that is coupled to the system bus 38, or may be collected by other interfaces, such as a parallel port interface 50, game port or a universal serial bus (USB). Further, information may be printed using printer 52. The printer 52, and other parallel input/output devices, may be connected to the processing unit 32 through parallel port interface 50. A monitor 36, or other type of display device, is also connected to the system bus 38 via an interface, such as a video input/output 34. In addition to the monitor 36, computing environment 20 may include other peripheral output devices (not shown), such as speakers or other audible output.

The computing environment 20 may communicate with other electronic devices such as remote computer 68. Remote computer 68 may be another computing environment such as a server, router, network PC, peer device, telephone (wired or wireless), personal digital assistant, television, or the like. Remote computer 68 may include many or all of the elements described above relative to the computing environment 20. In one embodiment, the remote computer 68 is a server coupled with a database of historical financial data for a plurality of companies. Herein, the phrase "coupled with" is defined to mean directly connected to or indirectly connected with through one or more intermediate components. Such intermediate components may include both hardware and software based components. Alternatively, or in addition, the remote computer may include accounting and/or financial software for maintaining a company's internal recording keeping.

Figure 1B:
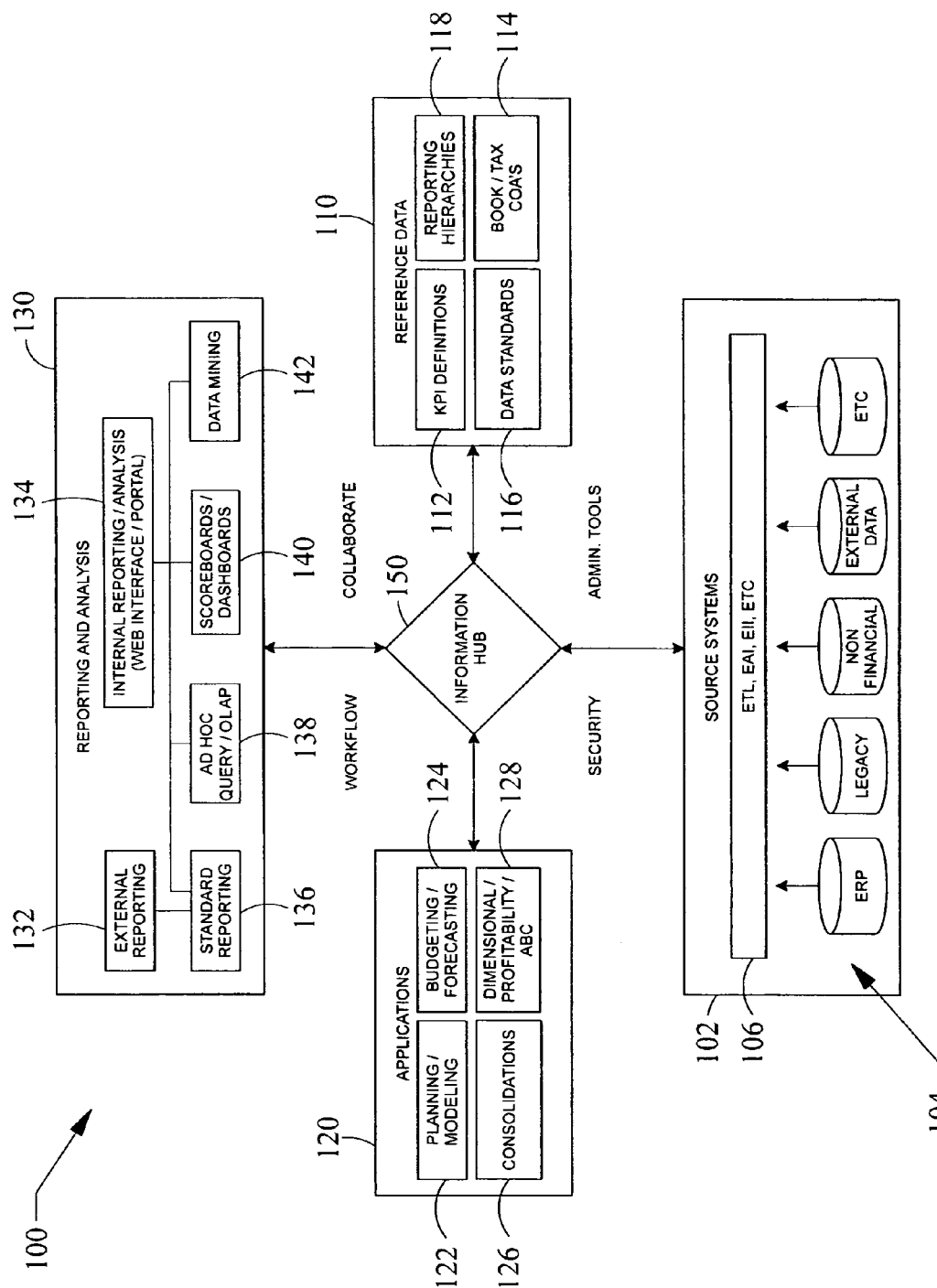
FIG. 1B is a diagram representative of an exemplary architecture for a BPM system.

To communicate, the computer environment 20 may operate in a networked environment using connections (wired, wireless or both wired and wireless) to one or more electronic devices. FIG. 1 depicts the computer environment networked with remote computer 68 and with information hub 150 of a distributed computer system for business performance management, as shown in FIG. 1B. The logical connections depicted in FIG. 1 include a local area network (LAN) 64 and a wide area network (WAN) 66. Such networking environments are commonplace in offices, enterprise-wide computer networks, intranets and the Internet.

When used in a LAN networking environment, the computing environment 20 may be connected to the LAN 64 through a network I/O 62. When used in a WAN networking environment, the computing environment 20 may include a modem 60 or other means for establishing communications over the WAN 66. The modem 60, which may be internal or external to computing environment 20, is connected to the system bus 38 via the serial port interface 54. In a networked environment, program modules depicted relative to the computing environment 20, or portions thereof, may be stored in a remote memory storage device resident on or accessible to remote computer 68. It will be appreciated that the network connections shown are exemplary and other means of establishing a communications link between the electronic devices may be used.

The new business performance management system and method is typically provided as software running on the processing unit 32, resident in the computer-readable medium of the storage device 42, to allow the processing unit 32 to provide the functionalities described herein. As described below, the software may be provided as a spreadsheet, for example as implemented on a spreadsheet program such as Microsoft Excel, however one skilled in the art would realize that the software may be provided as a stand-alone software program (i.e., implemented in any suitable programming language) operating on the processing unit 32 or any operating system provided therewith, and need not utilize any additional software operating on the system. Alternatively, or in addition, the functionalities may be provided as a combination of software and one or more ASICs to provide the functionalities discussed herein.

In further embodiments, as described below, the functionalities may also be provided as a web-based application running on a browser and accessible via the Internet or other communications network. Alternatively, the functionalities disclosed herein may be incorporated into an Executive Dashboard, described above. In yet another embodiment, the functionalities disclosed herein may be provided as a benchmarking service that analyzes historical data for a plurality of companies. The historical data may reside in a remote database, or may be internal to the benchmarking service. The benchmarking service may provide industry specific data and comparative benchmarks for particular industries, or provide general benchmarks that span multiple industries. In one embodiment, the functionalities are embedded into the architecture of a BPM management system via an information hub 150.

An exemplary BPM architecture 100 is shown in FIG. 1B. The architecture 100 may include various source systems 102, reference data 110, applications 120, and reporting and analysis tools 130 integrated by an information hub 150 that may provide support for collaboration of business units, workflow process management, security, and system administration. The source systems 102 may capture information about the company from various data sources 104 via various methods 106. Exemplary data sources 104 may include Enterprise Resource Planning systems (ERP), which are integrated information system that uses packaged software to serve any or all departments within an enterprise. For example, ERP systems may provide software for manufacturing, order entry, accounts receivable and payable, general ledger, purchasing, warehousing, transportation and human resources departments. Additional exemplary data sources 104 may include legacy systems as well as non-financial and external sources of data, and the like. Exemplary methods 106 for managing data from the data sources 104 may include Extraction, Transformation and Loading (ETL), which may be used copy data between databases of different types, Enterprise Application Integration (EAI), which may be used to integrate applications within the company, Enterprise Intelligence Integration (EII, also known as Enterprise Information Integration), which may aggregate disparate sources 104 of business information into a single analyzable body of information, and the like.

The architecture 100 may also include reference data 110 that may define various definitions, standards, and the like. For example, the company may reference certain KPI definitions 112, reporting hierarchies 114, data standards 116, and code of authorities 118. Applications 120 may also be included to provide strategic analysis in areas such as planning/modeling 122, budgeting/forecasting 124, consolidations 126, and dimensional profitability/ABC 128. Finally, reporting and analysis tools 130 may also be provided to present the analytical results to business managers via useful reports, visualizations, and the like. Traditional BPM systems may provide, for example, reporting tools for external reporting 132, internal reporting 134, and standard reporting 136. Additionally, or alternatively, tools may be provided for ad hoc database querying 138, such as OnLine Analytical Processing (OLAP) software that allows the user to quickly analyze information that has been summarized into multi-dimensional views and hierarchies, executive scoreboards or dashboards 140, data mining tools 142, and the like. It should be apparent to one of ordinary skill in the art, that the source systems 100, reference data 110, applications 120, reporting and analysis tools 140, and information hub 150 capabilities necessary for a particular company may be implementation dependent, and that exact combination of tools provided may vary greatly without departing from the spirit and scope of the present invention.

Figure 2:
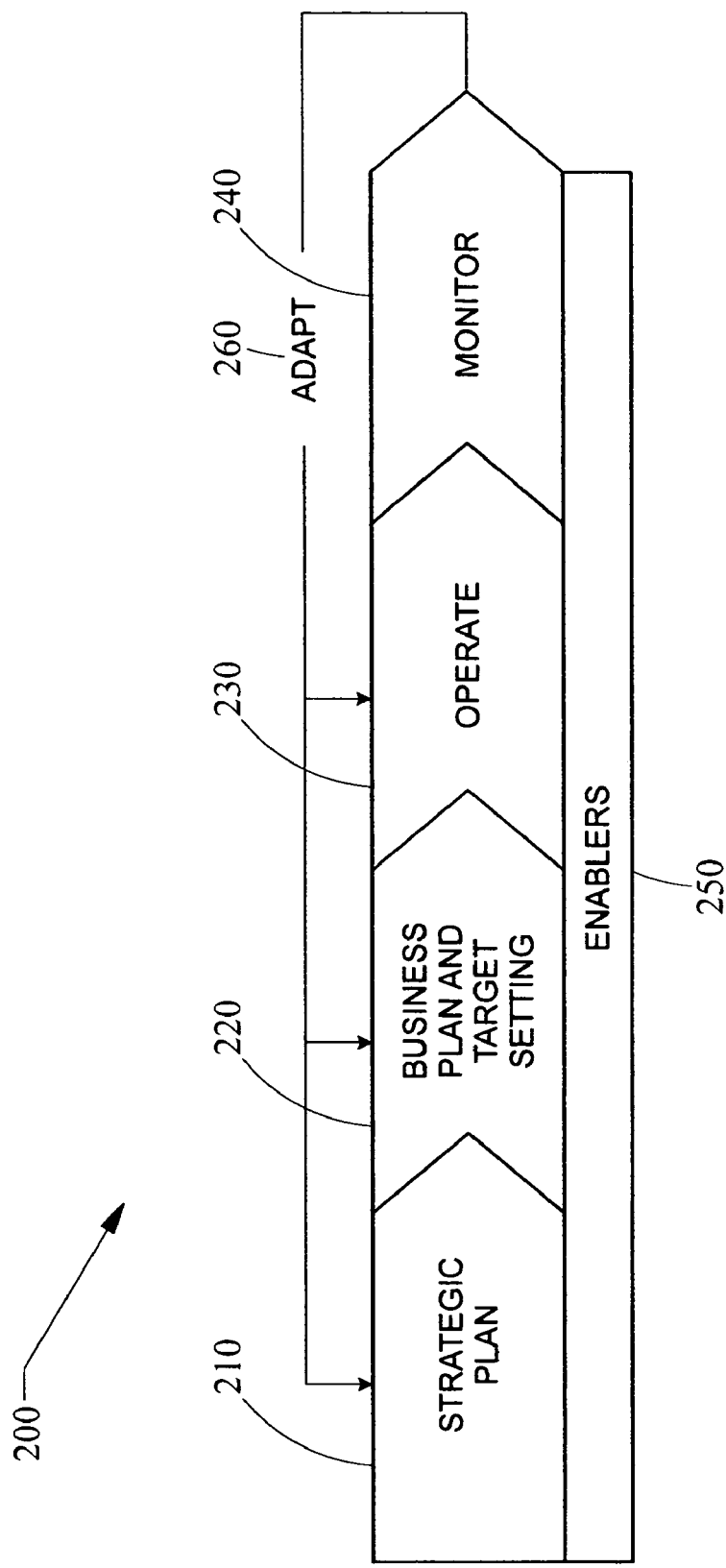
FIG. 2 is a diagram representative of an exemplary EPM technical architecture for implementing one embodiment.

Referring to FIG. 2, an exemplary framework 200 for delivering an integrated BPM system is shown. The framework 200 defines a process to drive strategy through to execution, with results informing periodic adjustments to both long and short term business tactics. The framework includes strategic planning 210, creating a business plan and target setting 220, managing operations 230, monitoring results 240, and enablers 250. The framework 200 also allows each of these areas to adapt 260 as results indicate. Exemplary strategic planning 210 tasks include environmental assessment, competitor assessment, analysis of business opportunities and key capabilities, and long-range financial planning. Exemplary tasks associated with business planning and targeted setting 220 include establishing a direction for products and services, determining the required capabilities, key initiatives, and determining revenue, cost and capital projections as well as budget and operational targets. Exemplary operational 230 tasks include setting operational targets, and managing initiatives, revenues, costs and capital. Exemplary monitoring 240 tasks include analyzing the prior period, forecasting, operational analysis, and dimensional analysis. Exemplary enablers 250 include employee incentives and rewards, and company policies and procedures.

Figure 3:
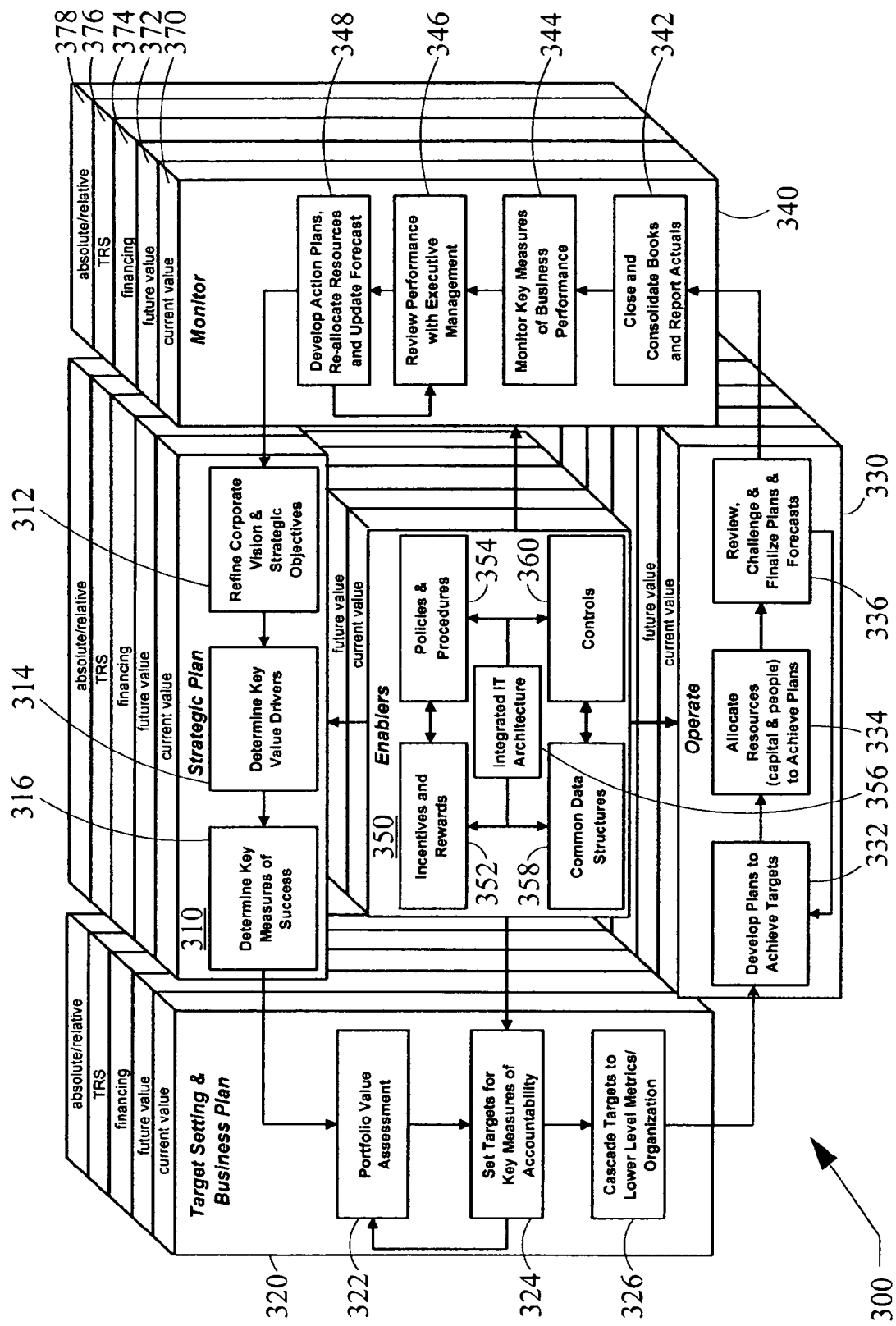
FIG. 3 is a diagram representative of an exemplary framework for delivering an integrated BPM system.

Referring to FIG. 3, an exemplary methodology for implementing the BPM framework of FIG. 2 is shown. As described above, current methodologies focus exclusively on internal performance metrics and current year performance. When utilizing the functionality described below, however, the framework 300 provides a holistic approach to BPM that allows a company to manage business performance across various aspects of its operations and at different levels. For example, a company may want to manage the performance of their business as it effects the company's current value 370, future value 372, financing 374 or TRS value 376, described in more detail below. Alternatively or additionally, the company may wish to see its performance across any of these areas in absolute or relative terms 378, such as raw number analysis, market indices or peer group assessments, respectively. The framework 300 represents the continuous process of strategic planning 310, target setting and business plan development 320, operating 330, and monitoring performance 340 as supported by various enablers 350. An exemplary methodology for strategic planning 310 includes refining corporate vision and strategic objectives 312, determining key value drivers 314, and determining key measures of success 316 activities. The functionalities disclosed herein may find particular use in the strategic planning 310 phase when refining the corporate vision and strategic objectives 312, for example, when analyzing investor expectations, key competitor information and current and future business performance. Similarly, the functionalities disclosed herein may be used to determine the key value drivers 314, for example, by providing a mapping of the value drivers to various performance metrics, and for determining the key measures of success 316, for example, by aligning those measures with shareholder value creation to create cause and effect maps.

An exemplary methodology for target setting and business plan development 320 includes portfolio value assessment 322, set targets for key measures of accountability 324, and cascade targets to lower level metrics/organization 326 activities. As described in more detail below, the functionalities disclosed herein may find particular use in setting targets for key measures of accountability 324, for example, by aligning top down targets with shareholder expectations and ensuring the consistency of external and internal targets. Similarly, the functionalities disclosed herein are ideally suited to cascade the targets to lower level metrics 326.

Exemplary methodology activities for operations 330 include developing plans to achieve the specified targets 332, allocating resources (in terms of both capital and man-power) to achieve all business plans 334, and reviewing, challenging, and finalizing plans and forecasts 336. The functionalities disclosed herein facilitate each of these activities 332, 334, and 336 by providing a clear mapping of target values to business and operational drivers to enable bottom-up resource allocation in line with the established target values.

An exemplary methodology for monitoring performance 340 includes activities for closing and consolidating books and reporting actuals 342, monitoring key measures of business performance 344, reviewing performance with executive management 346, and developing action plans, re-allocating resources and updating forecasts. The functionalities disclosed herein facilitate performance monitoring 340 by providing a consistent system for measuring the performance of the company and a simple user interface to determine exceptions and root causes of poor performance. Coupling these functionalities with a balanced scorecard or executive dashboard, as mentioned above, further enhance these advantages.

Finally, exemplary methodology activities for enablers 350 include establishing, analyzing, and adapting employee incentive and rewards programs 352 and policies and procedures 354, and providing an integrated IT architecture 356, such as the architecture describe above in reference to FIG. 1B, or other software solution projects that utilizes an effective set of common data structures 358 and controls 360.

In order to overcome the disadvantages of the prior art BPM systems, the financial performance metrics used to analyze a company's business performance should take an external view of the company's current and future value. One such external performance metric is the Total Return to Shareholders (TRS), and is defined as the company's equity plus any dividends paid on the stock. TRS can be calculated for a given shareholder by adding dividends to any stock price appreciation and dividing the resultant value by the shareholder's original investment. Coupling the external metric TRS with internal metrics of performance allows the company to see exactly what drives shareholder value.

Figure 4A:
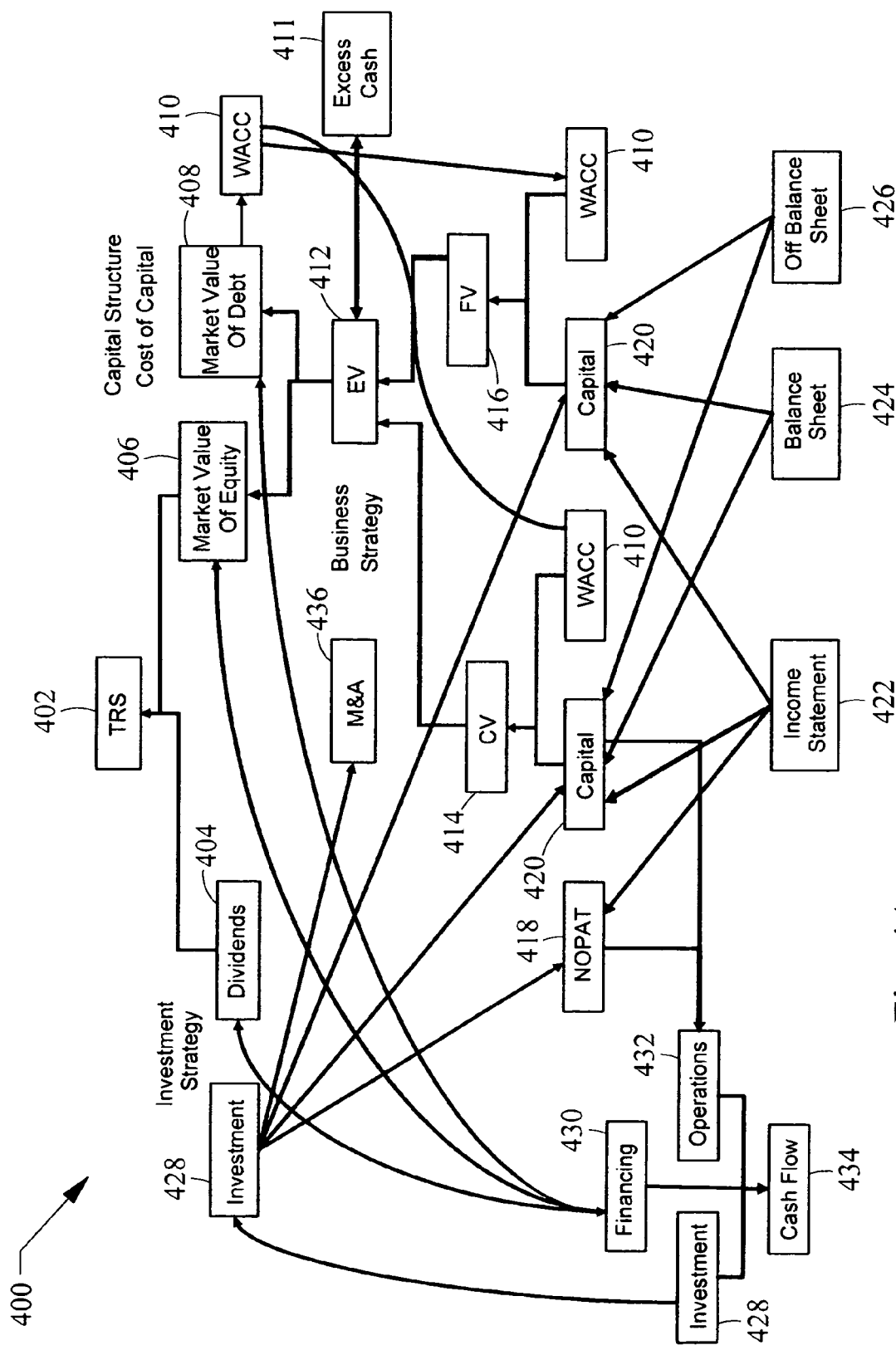
FIG. 4A is a diagram representative of one embodiment of a Total Return to Shareholder (TRS) map depicting exemplary interrelations between internal and external business metrics.

FIG. 4A shows an exemplary flowchart detailing the coupling of TRS with internal performance metrics and the interrelationships therein, also known as a TRS map 400. As described above, TRS 402 includes dividends 404 paid on the stock as well as the company's market value of equity or MVE 406. MVE 406 can be calculated by shares outstanding times share price. A company's debt 408 to equity structure influences its Weighted Average Cost of Capital 410 (WACC). The total market value of the company (MV) may be defined as the MVE 406 plus the market value of the debt 408.

Enterprise Value (EV) 412 (EV=MV less excess cash,411) can be decomposed into Current Value 414 (CV) and Future Value 416 (FV). The CV 414 represents the current value of the company. The CV 414 is influenced by the company's Net Operating Profits Less Adjusted Taxes 418 (NOPLAT), capital 420, and WACC 410, and can be calculated by dividing the NOPLAT 418 by the WACC 410 (which is also equal to Capital 420+EP/WACC 410), such that CV 414=NOPLAT 418/WACC 410=Capital 420+EP/WACC 410. The FV 416 represents the future value of the company, or the difference between the EV 412 and the CV 414. The FV 416 is influenced by capital 420 and the WACC 410, and can be calculated by subtracting the CV 414 from the EV 412, such that FV=EV−CV. As further detail in FIG. 4A, the capital 420 includes both balance sheet 424 and off-balance sheet 426 components. Additionally, income 422 may influence capital 420 as well as the NOPLAT 418.

The data underpinning these performance metrics also have an effect on the cash flow 434 of the company. Cash flow 434 is determined by the investments 428 made in the company, any financing arrangements 430, as well as operations 432 results. The operations 432 results are influenced by the NOPLAT 418 and the capital 420. Financing arrangements 430 influence the equity 406 of the company, its debt 408, and the ability of the company to pay dividends 404. This may affect the decision of investors to make an investment 428 in the company, which may affect the NOPLAT 418, capital 420 and Mergers and Acquistions 436 (M & A) of the company.

Figure 4B:
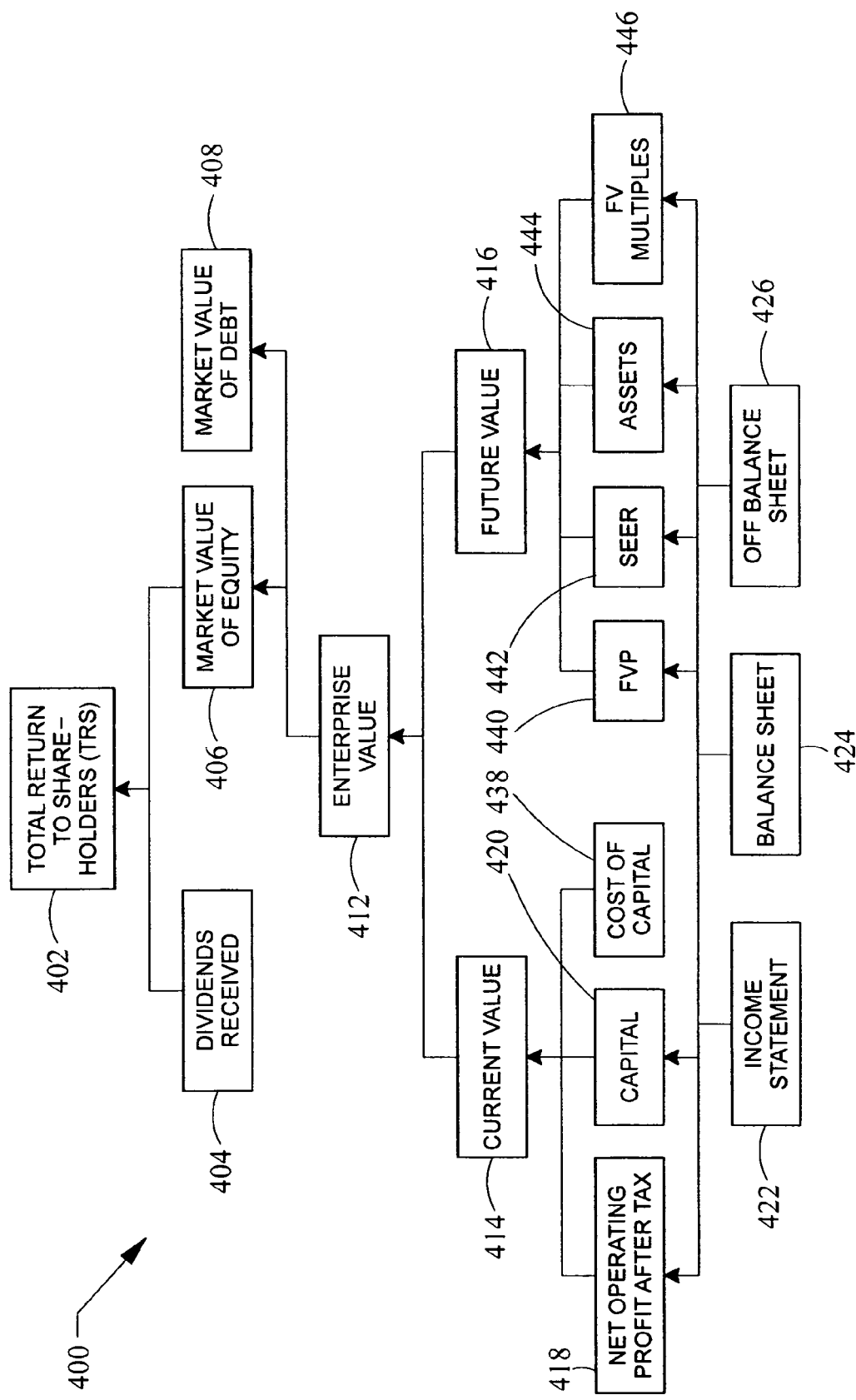
FIG. 4B is a diagram representative of a second embodiment of a TRS map depicting exemplary interrelations between internal and external business metrics.

FIG. 4B depicts an alternative embodiment of the TRS map 400. In the embodiment of FIG. 4B, the FV 416 may be further broken down into component parts via a variety of methods, each of which attempt to define the true drivers of FV 416. For example, one may use an FV premium 440 methodology to determine a company's FV 416 growth relative to the growth of the economy (segment or index) generally. In one embodiment, the FV premium methodology 440 may decompose the FV 416 value into three components: a first component that represents an operating advantage/disadvantage for the company; a second component that defines a projected rate of growth for the economy in general; and a third component that defines the remainder of FV 416 in the company.

In the FV premium methodology 440, the first component may represent an operating advantage/disadvantage for the company. This component may define whether the company is creating or destroying value in the current period, and may be calculated, for example, by calculating a company's economic profit (EP) capitalized (EP/WACC). As described in more detail below, EP may be calculated as a company's NOPLAT less a capital charge for the company, where the capital charge may be defined as a company's invested capital times a WACC for the company, such that EP=NOPLAT−(Invested Capital*WACC). If this value is negative, the company is operating at a disadvantage and is destroying the value of capital entrusted to the company. If this value is positive, the company is operating at an advantage and has generated a premium over the value of capital that is embedded in the company's CV 414. This first component thus defines the portion of FV 416 explained by investor's expected improvement to breakeven EP.

The second component of the FV premium methodology 440 may define an implied growth of the economy in general. It should be apparent to one of ordinary skill in the art that this component may also define an implied growth rate for a particular market, market segment, industry, peer group, and the like. Additionally, this component may be determined using a variety of methods, each of which may be dependent on the market, market segment, etc. being analyzed. In one embodiment, the second component may represent an implied growth in the economy as determined by a terminal value calculation based on the US Gross Domestic Product (GDP). Typically, the terminal value of a perpetually growing firm may be defined as the Free Cash Flow of a company for the next period divided by WACC minus a terminal growth rate, or $FCF_{t+1}/(WACC-g)$. By substituting a breakeven NOPLAT value, or the point at which zero EP is being generated, for the Free Cash Flow of the company ($FTF_{t+1}$) and the historical growth rate of the US GDP for the terminal growth rate (g), one can determine that portion of a company's FV 416 implied by the growth rate of the economy. In one embodiment, the breakeven NOPLAT may be defined as a company's invested capital times WACC, such that the portion of a company's FV 416 attributable to the implied growth of the economy may be calculated by the following equation: (Invested Capital*WACC)/(WACC−g). An exemplary growth rate for the US GDP is 3.41%, adjusted for inflation.

The third component, or the FV premium component, of the FV premium methodology 440 includes the remainder of any FV 416 not explained by the first two components, or the FV 416 of the company minus that portion of FV 416 explained by the implied growth of economy minus any FV 416 explained by an operating disadvantage. For companies operating at an advantage, the FV premium component may be defined as the FV 416 of the company minus that portion of FV 416 explained by the implied growth of economy. A positive FV premium component indicates that the company is outperforming the economy, market sector, industry, or the like, while a negative FV premium component indicates a growth rate below what is to be expected.

Alternatively, or additionally, other methodologies may be used to further analyze the FV 416 of a company. Exemplary methodologies include a SEER© methodology 442 that defines the drivers of FV 416, an asset methodology 444 that breaks down FV 416 by each company asset that drives FV 416, and an FV multiples methodology that analyzes a companies investments in the drivers of FV 416 to suggest investment strategies that may maximize FV 416. Each of these methodologies is described in more detail in U.S. Patent Publication No. 2005/0209942 entitled "Future Value Drivers," to John J. Ballow et al., filed on Mar. 2, 2005, the entire disclosure of which is hereby incorporated by reference.

Figure 4C:
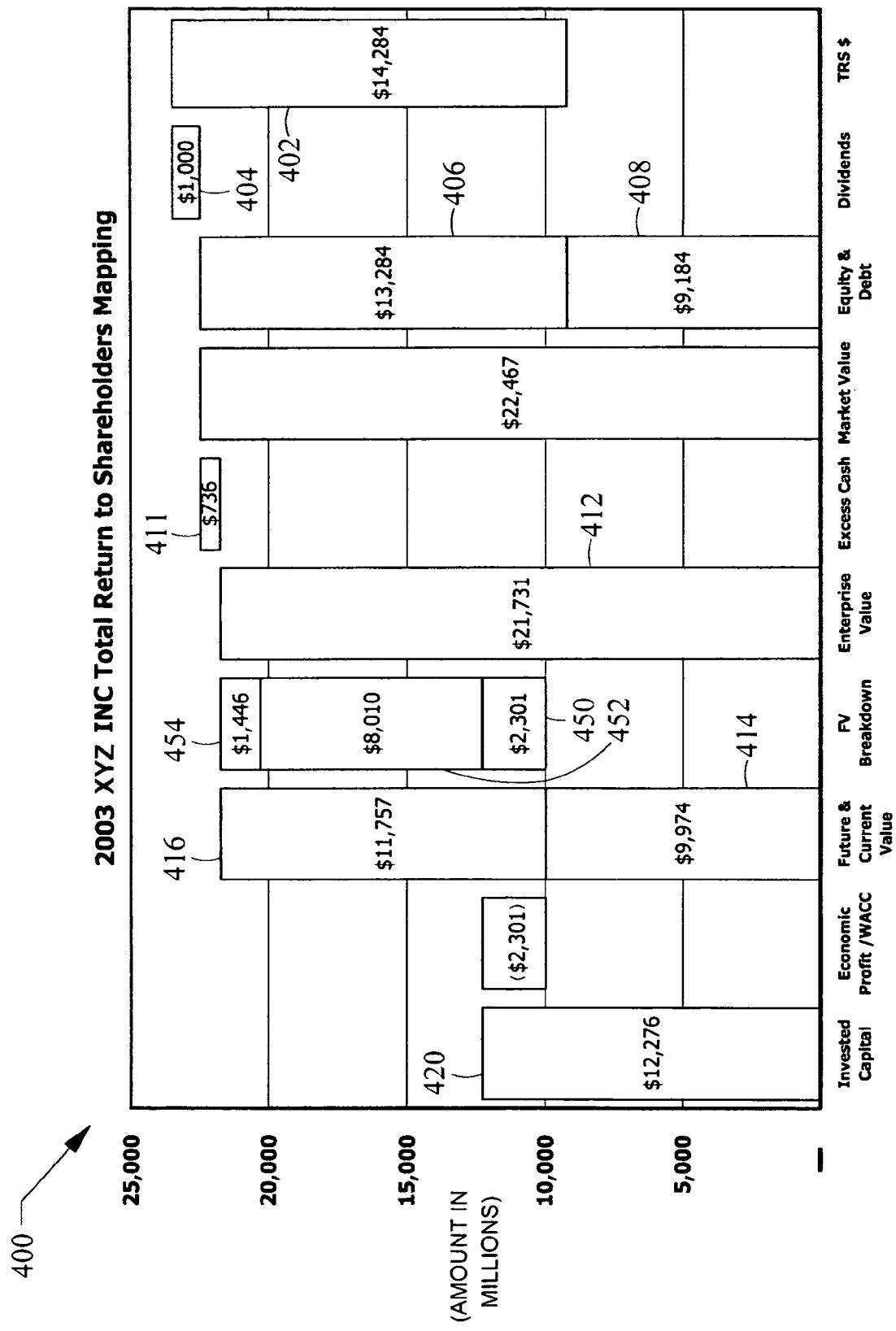
FIG. 4C is a diagram representative of a third embodiment of a TRS map depicting exemplary interrelations between internal and external business metrics.

Referring now to FIG. 4C, an exemplary visualization for displaying a TRS map 400 is shown. In the embodiment of FIG. 4C, a bar graph is used to visually convey the various components of a TRS map 400 to a user, and may be used to explain the TRS 402 for a particular period of time. For example, assume a company had a TRS 402 of $14,284 for a given period while paying $1000 in dividends 404 over that same period, resulting in a market value of equity 406 equal to $13,284. Further assuming a market value of debt 408 for the company of $9,184, the total market value of the company may be calculated at $22,467. Subtracting any excess cash 411 for the period leaves an enterprise value 412 of $21,731. If the company has an invested capital 420 of $12,276 and EP/WACC of ($2301), it can be calculated that the company's equity value 412 includes $9,974 of CV 414 and $11,757 of FV 416. Using the FV premium methodology 440, one can determine that the various components of FV 416 include a first portion 450 of $2,301 based on the expectation that the company will reach a breakeven economic profit, a second portion 452 of $8,010 based on an expected growth of the economy generally, and a third portion 454 of $1,446 which represents an expectation that the growth of the company will exceed that of the economy.

In FIGS. 5A-B, an exemplary TRS statement detailing a Total Economic Profit (TEP) 510 calculation is shown. TEP represents one metric for annualizing and managing current and future value that bridges the gap between internal performance metrics and external metrics such as TRS. The TEP 510 of a company may be defined to include economic profit portions attributable to the current year, future value, capital charges, financing, and the like, or any combination thereof. The TEP 510 may be calculated for a given year, such as for tracking historical performance 520 of a company, or may be calculated for the enterprise as a whole. Additionally, change percentages 522 for the TEP may also be calculated. in one embodiment, the TEP 510 may also be used for target setting 530, described in more detail in U.S. Patent Publication No. 2005/0209944 entitled "TRS Target Setting," to John J. Ballow et al., filed on Mar. 2, 2005, the entire disclosure of which is hereby incorporated by reference. In the embodiment of FIGS. 5A-B, the TEP 510 is calculated by adding an EP 502 component, an invested capital charge 504, an EP of FV component 504, and an EP of financing component 504. The EP 502 component defines economic profit for the current value of the company for the given period, and may be calculated by multiplying the invested capital 540 of a company by its WACC 542 and subtracting the resultant value from company's NOPLAT 544. The invested capital charge 504 maybe calculated by multiplying the company's invested capital 540 by the company's WACC 542. The Economic Profit of Future Value (EP of FV) 506 represents the economic profit of future value component 510 and may be calculated by multiplying the FV 546 of the company by its WACC 542. Optionally, the EP of finance 508 represents the portion of EP attributable to the company's financing arrangements. In one embodiment the EP of finance 508 may be calculated by multiplying the dividends 548 paid for the period by the total number of outstanding shares 550 and dividing the resultant value by the company's WACC 542, such that the EP of finance 508=(Dividends per Share*Outstanding Shares) *WACC/WACC. Finally, the TEP 510 is calculated by adding the EP of CV 502, the capital charge 504, the EP of FV 506, and the EP of finance 510, so that the a capitalized change in TEP for a given period is equal to the TRS for that period.

The TEP can then be used to calculate the TRS for a given year. The TRS change for a given period can be calculated in dollars by calculating the change in TEP for the period (TEP at the end of the period minus TEP at the beginning of the period) and dividing the result by the WACC. Next, any change in debt is subtracted from the resultant value, and finally the dividends are added, such that the TEP ($)= (TEP2−TEP1)/WACC−Change in Debt+Dividends.

These calculations may also be represented as follows:

$$TRS\$ = MV2 - MV1 + Dividends \qquad (Eq.\ 1)$$

$$TRS\% = (MV2 - MV1 + Dividends)/MV1 * 100 \qquad (Eq.\ 2)$$

Where $MV2$ is the market value of equity at the end of the period, $MV1$ is the market value of equity at the beginning of the period and dividends are issued during the period.

$$EP = NOPLAT - (Capital * WACC) \qquad (Eq.\ 3)$$
$$= EP\ of\ CV$$

$$CV = NOPLAT/WACC \qquad (Eq.\ 4)$$
$$= Capital + EP/WACC$$

$$MV = Equity + Debt \qquad (Eq.\ 5)$$
$$= EV + excess\ cash$$
$$= cv + fv + excess\ cash$$

$$EV = equity + Debt - excess\ cash \qquad (Eq.\ 6)$$
$$= mv - excess\ cash$$

$$FV = EV - CV \qquad (Eq.\ 7)$$
$$= Equity + Debt - EP/WACC - capital - excess\ cash$$
$$= Equity + Debt - NOPLAT/WACC - excess\ cash$$

$$EP\ of\ Fv = FV * WACC\ (Decapitalizing\ Future\ Value) \qquad (Eq.\ 8)$$

$$TEP = Capital * Wacc + EP\ of\ CV + EP\ of\ FV + \qquad (Eq.\ 9)$$
$$EP\ of\ Financing$$

$$TRS = (TEP2/WACC2 - TEP1/WACC1) - 1 \qquad (Eq.\ 10)$$

Using annual TRS calculations allows a company to set target TRS values and decompose the TRS target (or shareholder expected returns) into values for Operating Capital and performance (CV), Growth (FV), and Financing. These additional values can then be further broken down, as described below. Indexing can be used to show performance in absolute and relative terms.

An exemplary TRS target worksheet using the TEP metric is shown in FIG. 6. Although the exemplary TRS worksheet of FIG. 6 contemplates TRS target setting, it should be apparent to one of ordinary skill in the art that a similar worksheet could be used to track historical performance of a company's TRS as well. Initially, a desired growth rate 602, dividend payment percentage 604, and debt/equity ratio 606 are established. In the example of FIG. 6, the company desires a ten percent growth rate 602, a five percent dividend payment 604, and a debt/equity ratio 606 of forty percent. Target TRS percentage changes 610 are then established for each of the desired year based on the growth percentage 602. Next, the TRS percentage changes 610 are converted to TRS dollar amount changes 612 for each year. The dividend targets 614 are calculated based on the desired dividend rate 604. Finally, the equity 616 and debt 618 values are calculated as a function of the desired debt/equity ratio 606. As the cost of equity (ke) is embedded in the WACC, setting a TRS target=ke assures meeting investor expectations ie. equity growth at ke.

From these values, the equations described above can be used to establish target values for additional performance metrics. These include targets for EV 620, EP of CV 622, FV 624, EP 626, EP of FV 628, and TEP 630. Finally, the annual TRS dollar change 632 can be calculated as a function of the TEP targets 630 to verify the calculations. These targets can then be decomposed further into targets for the drivers of each of these metrics to help the company reach these targets.

As noted above, the decomposition and mapping of the current and future value components of the total return to shareholders along with associated business processes or business components that drive those values provides valuable software tools for use in analyzing business performance and in managing the operation of those business components. As used herein, a business component may be an organizational sub-division of a company or enterprise. A business component also may be a business process within an enterprise that may be analyzed as an independent operation from a financial perspective.

In one embodiment, for example, a software tool may be provided on a laptop computer for use by a business consultant. In person-to-person interviews with a client, financial data may be input into a computer having a spreadsheet programmed to perform the calculations noted above. The spreadsheet may execute the calculations and presently generate reports on the display of the laptop for review by the consultant and client. The decomposition of shareholder value into component parts may displayed in graphical hierarchical maps that provide powerful depictions of hypothetical scenarios of the effect that drivers of business components have on current and future enterprise values.

In another embodiment, the program executing the calculations may be resident on computer-readable medium in a server in communication with a privately accessible data communication network, such as the internet or a WAN. The program may be accessed through a computer having a browser based interface to implement the same scenario identified above, or scenarios identified below.

Using the above spreadsheet or similarly programmed software tool implementing the method of this invention, one may quickly identify business component values that under perform industry benchmarks or corporate targets. The identified components may be candidates for further analysis to determine whether technology solutions may be provided to raise performance standards and enhance shareholder value. The spreadsheet or other software tool may include a library of standard technology solutions associated with each business component. Such solutions may be displayed or included in a report generated that describes the identified underperforming component and solutions that require further analysis for implementation to achieve benchmark or other target performance.

In yet another embodiment, the invention may be implemented in an enterprise as part of the business management software. A computer in communication with the financial accounting system may import financial data representative of the performance of a plurality of business components. The financial data may be manipulated to correspond with business components according to a map of business components identified as driving current or future value of shareholder returns. The financial data may then be analyzed in accordance with this invention to determine and display the expected actual shareholder return driven by the actual performance. Such data may be graphically displayed in a hierarchical map, or in the form of an executive dashboard. The actual performance financial data may be displayed along side with target values for various business component values. Colors, such as green, yellow, or red, for example, may be used to identify the relative performance, such as above, below, or greatly below target values assigned to individual business components. Additionally, acceptable tolerances for each business component target value may be established and reflected in the display. Such tools may be useful when integrated as monitoring tools into the business performance management frameworks, such as described in association with FIGS. 2 and 3.

In still another embodiment, the invention may be implemented in the form of a financial data provider. A database containing a historical store of financial data of corporation may be in communication on a publicly accessible network. For a fee, financial analysts may access such data and, using the software tools with on their own systems or on a server dedicated to this database, the financial analysts may map the components of shareholder value across broad swaths of industry segments. Also, the financial analysts may focus on a specific industry to determine industry benchmarks of component values. Those component benchmarks may be applied to generate financial report maps used for comparison purposes in making investment decisions with a specific company. Alternatively, the benchmarks may be used for comparison to identify which business components within a company are underperforming competitors, to enable business mangers to determine which business components require additional resources to maintain competitive performance levels.

In an alternative embodiment, the invention may be implemented in the form of target setting, forecasting, and budgeting tools in which targets are selected at a high level of management through a process of strategic planning to select targets based on a combination of value, such as TRS value for example, expected to be added and manageability of the candidate targets. In one embodiment, computer simulations of, inter alia, increased cash flows expected by the target strategies. These targets may then be flowed down to the various levels of management, budgets may be constructed around those target strategies, and the budgets may be consolidated and flowed upward. Alternatively, or additionally, the system may be used to increase shareholder value by improving forecasting abilities through the use of graphical representations of performance metrics of similarly situated companies in order to identify realistic value enhancing business strategies as goals for the organization. Exemplary systems of these types include those described in U.S. Patent Publication Nos. 2004/0073441 A1 and 2004/0073477 A1, both to Heyns et al., the entire disclosures of which are hereby incorporated by reference.

In still another embodiment, the invention may be implemented in a system for automatically examining a company's financial data and evaluating factors affecting the company's stock value. The system may, for example, evaluate a company's spread through that company's debt and equity costs and measure returns to investors from company growth, which may be either organic growth or growth through mergers and acquisitions. The system may also evaluate the financial data of other publicly traded companies, such as those in the same industry, and compares the various factors affecting stock value. The system may also include tools for determining the return to investors, such as a software-based application that collects receives financial data and uses this information to calculate the return to inventor through the company's spreads and growth. An exemplary systems of these types include those described in U.S. Patent Publication Nos. 2005/0004832 A1, to Ostergard et al., the entire disclosure of which is hereby incorporated by reference.

Another aspect of the invention provides comprehensive performance analysis of a company, and is illustrated in FIGS. 7-17. This embodiment includes a dynamic competitive modeling tool that allows one to interactively analyze a company's business strategy. The tool is suitable for analyzing the strategic environment of a company or business unit by graphically depicting the historical and forecasted performance of a company relative to its peers. Preferably the tool includes a financial model of a company's performance based on the TRS Mapping algorithms described above. By using the TRS Mapping algorithms, on the one hand, the tool can predict the market reaction to the operational and strategic plan to enable a company's management to wisely select a plan keeping shareholder expectations in mind. On the other hand, since the tool relies on publicly reported financial data, the tool can be used by outside analysts to benchmark a company's forecast performance for evaluating investment decisions.

The tool displays a company's historical performance metrics and embeds interactive inputs to permit a user to "dial-in" the forecasted financial metrics indicative of a company's operational and strategic planning. As a default, published forecasts may be used as the starting point for the analysis. These historical and forecasted metrics are dynamically tied into the powerful visualization tools to graphically depict the effect the inputted forecasted metrics have on multiple key performance measures, such as total return to shareholders. The tool has the capability to graphically depict the performance of selected peer companies on the same chart to provide a graphical comparison of the effect a selected operational and strategic plan may have relative to others.

As described in more detail below, the visualization tool has the capability to graphically depict financial performance on a single graph with four or five dimensions. The visualizations are effective to aid in competitive advantage analysis, such as the type described by Michael Porter in the classic text Competitive Analysis. Preferably, on one graph to evaluate profitability versus capital efficiency (FIG. 15), the five dimensions are profitability (Y-axis), capital utilization (X-axis), return on capital spread (iso-quants), market value (bubble size) and time (trend lines). Preferably, on a second graph to evaluate operating advantage versus strategic advantage (FIG. 16), the four dimensions are return on capital spread (Y-axis), Future Value efficiency (X-axis); market value (bubble size) and time (trend lines). The visualizations are interactive and dynamic in that the forecast metrics may be changed directly through input fields on the display and immediately the data is plotted on the graphs to graphically depict the change in the forecasted trends.

Figure 7:
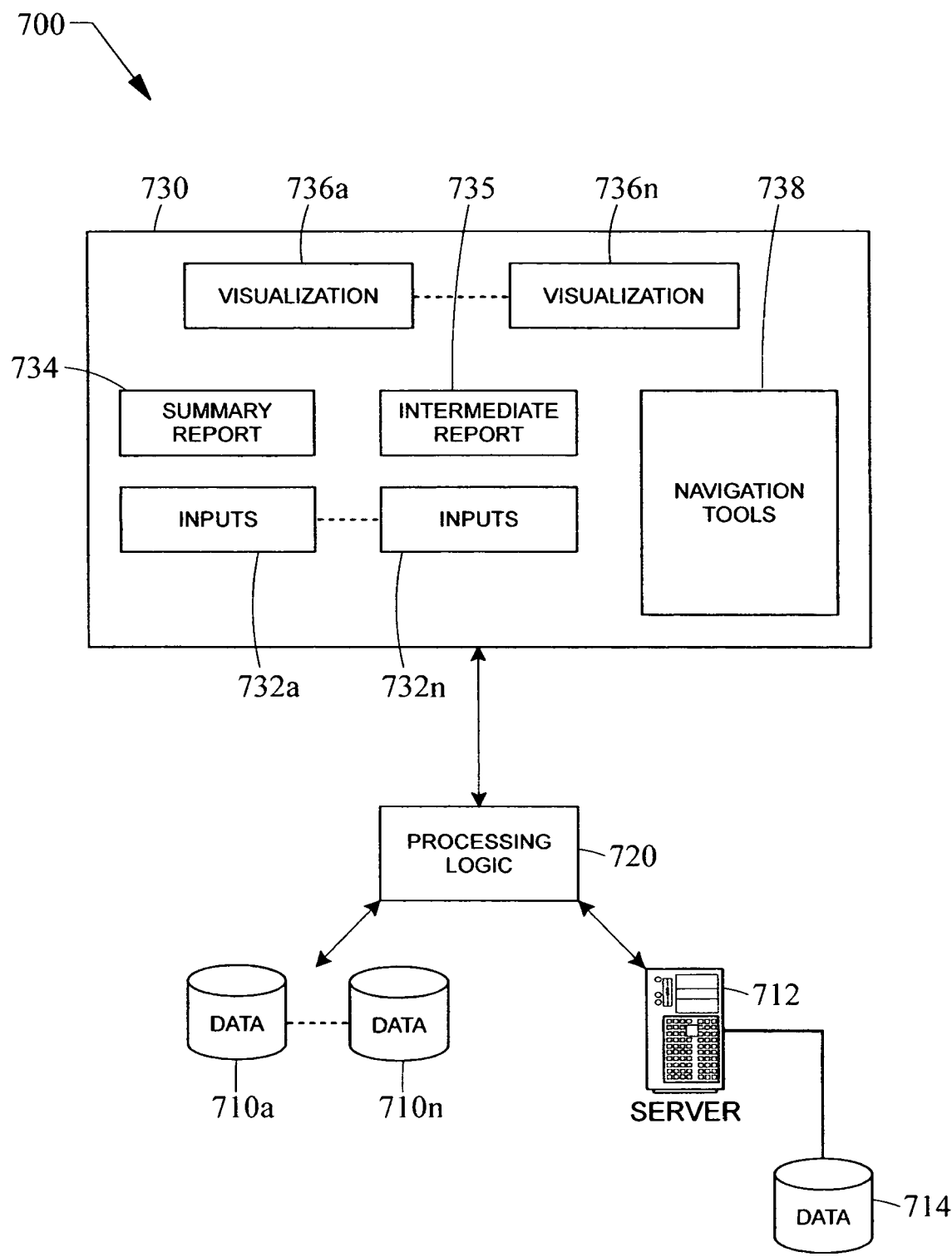
FIG. 7 is an exemplary comprehensive performance analysis tool.
Figure 17:
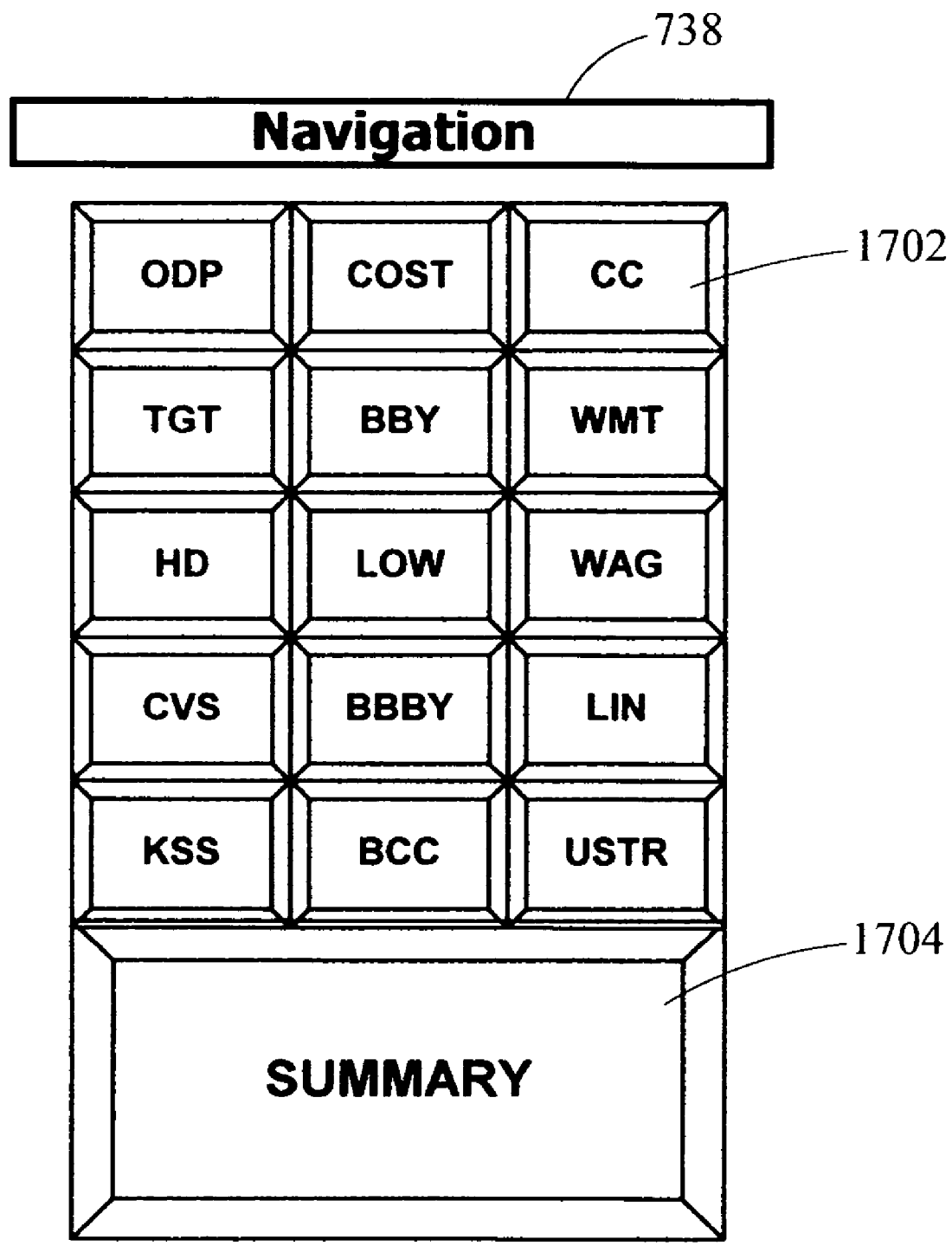
FIG. 17 is an exemplary navigation tool for the analysis tool of FIG. 7.

As shown in FIG. 7, the system 700 may include a plurality of data sources 710a-710n containing financial information, processing logic 720 for determining various performance metrics and information from the financial data, and a user interface 730 for collecting operator inputs 732a-732n and displaying various information, such as a summary report 734, intermediate reports 735, visualizations 736a-736n, and the like. Each of these components may be provided individually, or in combination with one another. The user interface 730 may also include navigation tools 738 for navigating among the various components of the interface 730, updating or refreshing the reports 734 and 735 or visualizations 736a-736n, and the like. For example, FIG. 17 shows an exemplary navigation tool 738 that includes a plurality of buttons 1702 each associated with a business unit being analyzed and a summary button 1704. Activation of the buttons 1702 and 1704 may cause the summary 734 and intermediate 735 reports to be updated with information related to the associated business unit or summary information, respectively.

Referring again to FIG. 7, the system may include a server 712 at a financial data provider with a large data store 714 of the reported financial data and prices of publicly traded financial instruments of publicly traded companies in one embodiment. Preferably, the data store contains historical data that may be provided or sold to others. The server 712 may be connected to a publicly accessible distributed data network, such as the Internet. Communications with the processing logic 720 may occur over such a network.

Processing logic 720, which may be maintained by a publicly traded company, is in communication with either the data sources 710a-710n, the server 712, or a combination of data sources 710 and servers 712. The processing logic 720 may be implemented as either software or hardware on a single computer or across multiple computers. The processing logic 720 may be in communication with a database 710 containing the companies' current and historical accounting and financial data. The processing logic 720 may also include modules for determining various performance metrics for a business unit associated with the company. The business units may include any component of the company for which financial data may be segregated, such as departments, subsidiaries, product lines, geographical regions, product SKUs and the like. In one embodiment, the business units may also include similar information for a competitor of the company, such as industry peers. Optionally or alternatively, the server 712 may be maintained by private investment analysts firms that analyze publicly traded companies and provide investment recommendations for private investors or the public. In such an embodiment, conventional periodic corporate financial reports may be obtained by the processing logic 720 from those servers 712.

The processing logic 720 may be configured to determine various performance metrics and information from the financial information. Such determinations may include calculations based on the received financial information as well as selecting metrics or information included in the received financial information. Alternatively, or in addition, the processing logic may be configured to project performance metrics and information from historical information (such as databases of historical information, annual reports, and the like), user inputs 732a-732n, or any combination therein. In one embodiment, the processing logic 720 may include logic for determining any or all of the following exemplary performance metrics and/or information: revenue growth, performance benchmarking, spread calculations, return on invested capital, NOPLAT and invested capital, NOPLAT (bottom up), NOPLAT (top down), cash taxes, invested capital (asset side), invested capital (liabilities side), investor fund, return on investment trees (with or without goodwill), operating working capital trees (with or without operating working capital. Table 1.0 includes exemplary financial data, performance metrics, and information which may be determined by the processing logic 720.

TABLE 1.0

Company Name
Country of Operations
Currency
Credit Rating

TABLE 1.0-continued

Credit Ratings to be Used
Int Exp on Operating Lease
Int Exp on Retirement Liab
Current Market Capitalization
Operating Cash/Revenues
Off-Balance Sheet
Next Year's Operating Lease Expense
Unfunded Pension Liability
Unfunded Medical Benefits
Income Statement Checks
Amortization Check
Operating Profit Check
Interest Expense Check
Interest Income Check
Non-Operating Income Check
Balance Sheet Checks
Cash Check
Goodwill
Deferred Taxes
Minority Interest
Off-Balance Sheet
Current Year's Operating Lease Expense
Next Year's Operating Lease Expense
Unfunded Pension Liability
Unfunded Medical Benefits
Years for Revenue Growth
Revenue
Revenue Growth (Year over Year)
Avg Revenue Growth from Current Year
Revenue Growth CAGR (Present Back to Year X + 1)
Years for Performance Benchmarking
COGS (w/o Depreciation & Amortization)
COGS Margin
Gross Income
Gross Margin with D&A, not included in COGS)
SG&A Margin
EBITDA Margin
Depreciation Margin
Amortization Margin
EBIT Margin
Equity Market Cap
Net Debt (Includes Operating Leases)
Enterprise Value
Years for Spread Calculations w/ or w/o Goodwill
End of Year Spread w/o Goodwill
End of Year Spread w/ Goodwill
Average Spread w/o Goodwill
Average Spread w/ Goodwill
Years for Spread Calculations w/ or w//o NGW
Average Spread w/o NGW
Average Spread w/ NGW
Years for Return on Invested Capital
End of Year ROIC without Net Goodwill
End of Year ROIC with Net Goodwill
Mid-Year ROIC w/o NGW
Average ROIC w/ Goodwill
NOPLAT Reconciliation
Invested Capital Reconciliation
Revenues
COGS (w/o Dep & Amort)
Operating Lease Expense
Retirement Related Liabilities (RLL) Expense
SG&A
Other Operating Expenses
Depreciation & Amortization Expense
Adjusted EBIT
Amortization Expense
EBITA
Cash Taxes on EBITA
NOPLAT (Cash Tax Rate)
NOPLAT (Bottoms up)
Reported Net Income
Deferred Taxes
Amortization
Extraordinary Items
Minority Interest
Adjusted Net Income
After Tax Interest Expense
Interest Income after taxes
After Tax Non-Operating Income
After Tax Op Leases
After Tax Retirement Related Liabilities (RLL)
NOPLAT
Marginal Tax Rate (based on country of Operations)
Interest Income
Interest Expense
Operating Leases
Retirement Expenses
Non-Operating Expense, Net
Provision for Income Taxes
Change in Deferred Taxes
Tax on Interest Income
Tax Shield on Interest Expense
Tax on Operating Leases
Tax Shield on Retirement-related Liabilities
Tax on non-operating Income
Cash Taxes on EBITA
Operating Cash
Accounts Receivables
Inventory
Other Current Assets
Operating Current Assets
Accounts Payable
Income Taxes Payable
Other Current Liabilities
Non-Interest bearing Current Liabilities
Operating Working Capital
Net PPE
Implied Value of Operating Leases
Other Operating Assets
Other Operating Liabilities
Implied Value of Unfunded Retirement Liabilities
Invested Capital (w/o Goodwill)
Net Goodwill
Invested Capital w/ Goodwill
Excess Cash and Securities
Non-Operating Investments
Total Investor Funds
Invested Capital (Liabilities Side/Where From)
Shareholders Equity
Minority Interest
Adjusted Equity
All Interest Bearing Debt (including Operating Leases and
Return Liabilities)
Deferred Income Taxes
Cumulative Goodwill Amortization
Total Investor Fund
Average ROIC
PreTax ROIC
Cash Tax Rate on EBITA
EBITA/Revenues
COGS/Revenues
SG&A/Revenues
Other Operating Expenses/Revenues
Depreciation/Revenues
Revenues/Invested Capital
Operating Working Capital/Revs
Net PPE/Revs
Net Other assets/Revs
Goodwill/Revs
Revenues
Year over Year Growth
ROIC (w/o goodwill)
PreTax ROIC
Cash Tax Rate on EBITA
EBITA/Revenues
COGS/Revenues
SG&A/Revenues
Other Operating Expenses/Revenues
Depreciation/Revenues
Revenues/Invested Capital
Operating Working Capital/Revs
Net PPE/Revs
Other assets/Revs
Operating Working Capital
Operating Curr. Assets/Rev
Non Interest Bearing Current Liabilities/Revenue
Cash/Rev TABLE 1.0-continued Net Receivables/Rev
Inventory/Rev
Other Current Assets/Rev
Accounts Payable/Rev
Income Taxes Payable/Rev
Other Current Liabilities
Risk Free Rate
Market Risk Premium
Beta
Market Capitalization
Total Debt
Total Value
Ke
Credit Rating
Kd
Tax Rate
WACC
End of Year Spread w/o Goodwill
End of Year Spread w/ Goodwill
Average Spread w/o Goodwill
Average Spread w/ Goodwill
Average Spread w/o NGW
Average Spread w/ NGW
End of Year ROIC without Net Goodwill
End of Year ROIC with Net Goodwill
Mid-Year ROIC w/o NGW
Average ROIC w/ Goodwill
Invested Capital Reconciliation
Revenues
COGS (w/o Dep & Amort)
Operating Lease Expense
Retirement Related Liabilities (RLL) Expense
SG&A
Other Operating Expenses
Depreciation & Amortization Expense
Adjusted EBIT
Amortization Expense
EBITA
Marginal Taxes on EBITA
NOPLAT (Marg. Tax Rate)
Operating Cash
Accounts Receivables
Inventory
Other Current Assets
Operating Current Assets
Accounts Payable
Income Taxes Payable
Other Current Liabilities
Non-Interest bearing Current Liabilities
Operating Working Capital
Net PPE
Implied Value of Operating Leases
Other Operating Assets
Other Operating Liabilities
Implied Value of Unfunded Retirement Liabilities
Net Goodwill
Invested Capital w/ Goodwill
Excess Cash and Securities
Non-Operating Investments
Total Investor Funds
Shareholders Equity
Minority Interest
Adjusted Equity
All Interest Bearing Debt (including Operating Leases and Return Liabilities)
Deferred Income Taxes
Cumulative Goodwill Amortization
Total Investor Fund
Average ROIC
PreTax ROIC
Marginal Tax Rate on EBITA
EBITA/Revenues
COGS/Revenues
SG&A/Revenues
Other Operating Expenses/Revenues
Depreciation/Revenues
Revenues/Invested Capital
Operating Working Capital/Revs
Net PPE/Revs
Net Other assets/Revs
Goodwill/Revs
Revenues
Year over Year Growth
ROIC (w/o goodwill)
PreTax ROIC
Marginal Tax Rate on EBITA
EBITA/Revenues
COGS/Revenues
SG&A/Revenues
Other Operating Expenses/Revenues
Depreciation/Revenues
Revenues/Invested Capital
Operating Working Capital/Revs
Net PPE/Revs
Other assets/Revs
Operating Working Capital
Operating Curr. Assets/Rev
Non Interest Bearing Current Liabs/Rev
Cash/Rev
Net Receivables/Rev
Inventory/Rev
Other Current Assets/Rev
Accounts Payable/Rev
Income Taxes Payable/Rev
Other Current Liabilities
Risk Free Rate
Market Risk Premium
Beta
Market Capitalization
Total Debt
Total Value
Ke
Credit Rating
Kd
Tax Rate
WACC
Normalized NOPLAT
Enterprise Value
Value of Current Operations
    Weight
Value of Future Operations
    Weight
Normalized NOPLAT
Enterprise Value w/o Excess Cash
Value of Current Operations
    CV Weight w/o Excess Cash
Value of Future Operations w/o Excess Cash
    FV Weight w/o Excess Cash
Interest Coverage Ratio
Debt/Equity Ratio
EVA
Market Value Added
NOPLAT
Less: Capital Charge
Economic Profit
Revenue per Employee
Market/Book Ratio
Book Value
Benchmarking Averages
5 Year TRS (CAGR)
4 Year TRS (CAGR)
3 Year TRS (CAGR)
5 Year Average Spread (w/ NGW)
4 Year Average Spread (w/ NGW)
3 Year Average Spread (w/ NGW)
5 Year Average Spread (without NGW)
4 Year Average Spread (without NGW)
3 Year Average Spread (without NGW)
5 Year Average Revenue Growth
4 Year Average Revenue Growth
3 Year Average Revenue Growth
5 Year Average ROIC (with Goodwill)
4 Year Average ROIC (with Goodwill)
3 Year Average ROIC (with Goodwill)
5 Year Average ROIC (without Goodwill)
4 Year Average ROIC (without Goodwill)
3 Year Average ROIC (without Goodwill)
5 Year Average EBITA/Revenue TABLE 1.0-continued 4 Year Average EBITA/Revenue
3 Year Average EBITA/Revenue
5 Year Average Revenue/Invested Capital (w/ Goodwill)
4 Year Average Revenue/Invested Capital (w/ Goodwill)
3 Year Average Revenue/Invested Capital (w/ Goodwill)
5 Year Average Debt/Equity Ratio
4 Year Average Debt/Equity Ratio
3 Year Average Debt/Equity Ratio
5 Year Average Revenue/Employee
4 Year Average Revenue/Employee
3 Year Average Revenue/Employee
Gross Property, Plant and Equipment-STANDARD SVA RATIOS
Depreciation, Depletion and Amortization (Accumulated), Plant and Equipment
Net Property, Plant and Equipment Amortization (Accumulated)
Dec. (Inc.) in Invested Capital w/o Goodwill
Free Cash Flow
Capital Expenditures
Depreciation and Amortization Expense
Reinvestment Multiple
Gross Property, Plant and Equipment
Depreciation and Amortization Expense
Estimated Useful Life of Gross PP&E
Accumulated Depreciation and Amortization
Depreciation and Amortization Expense
Estimated Age of Depreciable Assets
Employee
Sales/Employee
Operating Assets/Employee
Operating Asset Turnover
Net Annual Sales
Average Receivables
A/R Turnover
Average A/R Collection Period = 365/A/R Turnover
Cost of Goods Sold
Average Inventory
Inventory Turnover
Average Inventory Processing Period = 365/Inventory Turnover
Cost of Goods Sold
Average Trade Payables
A/P Turnover Ratio
A/P Payment Period = 365/A/P Turnover Ratio
Average A/R Collection Period
Average Inventory Processing Period
Payables Payment Period
Cash Conversion Cycle
NOPLAT
WACC
Future Value
Economic Profit
EP/WACC
Future Value
MVA
MVA Check
Shares Outstanding (Total at Year-End)

The processing logic 720 may also be in communication with the user interface 730. In one embodiment, the processing logic 720 may receive inputs 732a-732n from the user interface 730, determine various performance metrics and information for a business unit of a company based any combination of the inputs 732a-732n and the financial data received from the various data sources 710a-710n, and generate summary information 736 and/or visualizations 736a-736n which may display data points related to the performance metrics or information.

Referring now to FIGS. 8-13, exemplary intermediate reports 735 are shown. These intermediate reports 735 may be provided with or without inputs 732a-732n. The purpose of these intermediate reports 735 are to provide additional performance metrics and information to the visualizations 736a-736n and summary report 734 to enrich the analysis provided by the system 700, as well as to provide a logical vehicle for receiving inputs 732a-732n related to the performance metrics and information included in the intermediate reports 732. Therefore, the intermediate reports 735 preferably include a combination of historical data and projected data.

Figure 8:
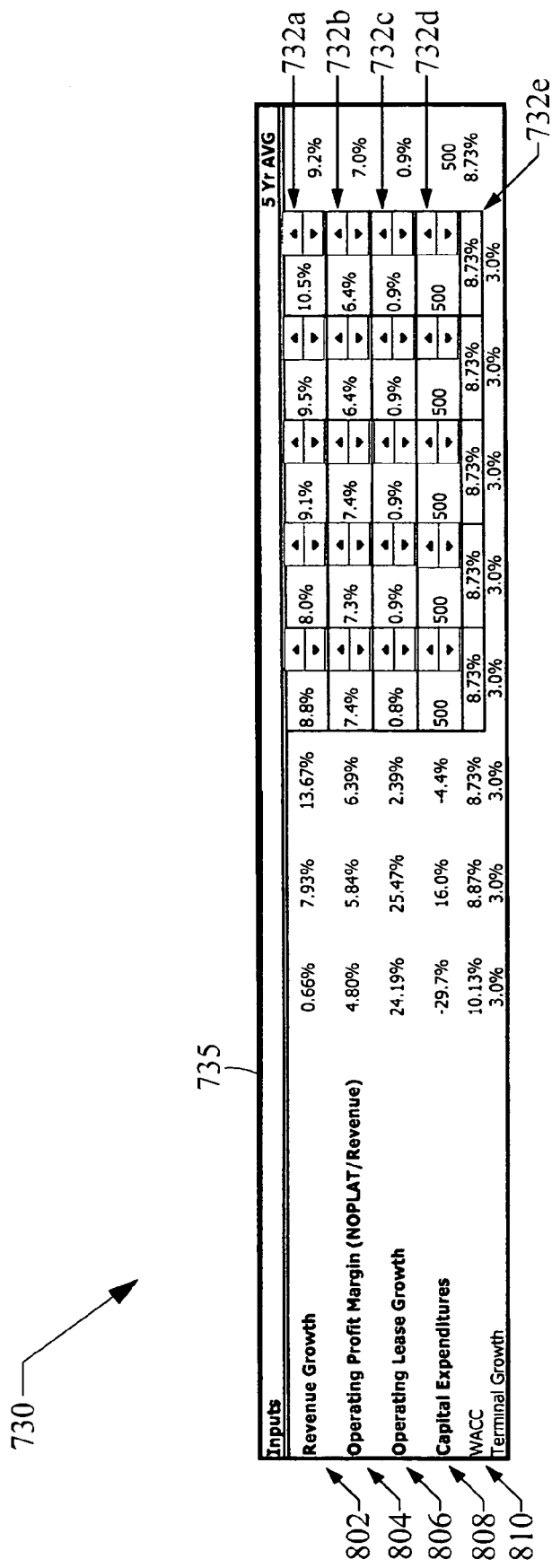
FIG. 8 is an exemplary forecast input interface for the analysis tool of FIG. 7.

The exemplary summary forecast report 735 [800] of FIG. 8 includes historical data and forecasted data for the revenue growth 802, operating profit margin (NOPLAT/Revenue) 804, Operating Lease Growth 806, Capital Expenditures 808. The forecasted data may be as a default based on published forecast estimates, or may accept data input in the respectrive fields 732a, 732b, 732c, 732d, and 732e. The data may be input simply by the use of active arrows to be clicked to increase or decrease the forecast changes of the metrics 802-810. The historical data associated with these metrics may include at least data for the current period and optionally data for prior periods. Preferably, the metrics shown in FIG. 8 are key variables that are used to calculate data on the multi-dimensional axes of the forecast analytical visualizations depicted in FIGS. 15 and 16. Accordingly, it is preferred that the summary report of FIG. 8 be displayed together with the visualizations of FIGS. 15 and 16 so that a user may change a forecasted metric and see the graphically represented change on future prospects of the business unit.

Referring to FIG. 9, another exemplary intermediate report 735 [900] is shown. The report 735 [900] may include metrics and information for calculating a top down NOPLAT. Exemplary top down NOPLAT metrics and information may include Cost of Goods Sold (COGS) 902 and marginal tax rate 904 historical data and future projection inputs 732f and 732g, respectively. Additional exemplary metrics and information 906 for a top down NOPLAT calculation may include gross margin, next year's operating lease expense, cost of debt, implied value of operating leases, operating lease expense, retirement related liabilities (RLL) expense, SBU SG&A, corporate SG&A, other operating expenses, depreciation and amortization expense, adjusted EBIT, amortization expense, marginal taxes on EBITA, operating profit (NOPLAT growth), and operating profit margin (NOPLAT/revenue).

Figure 10:
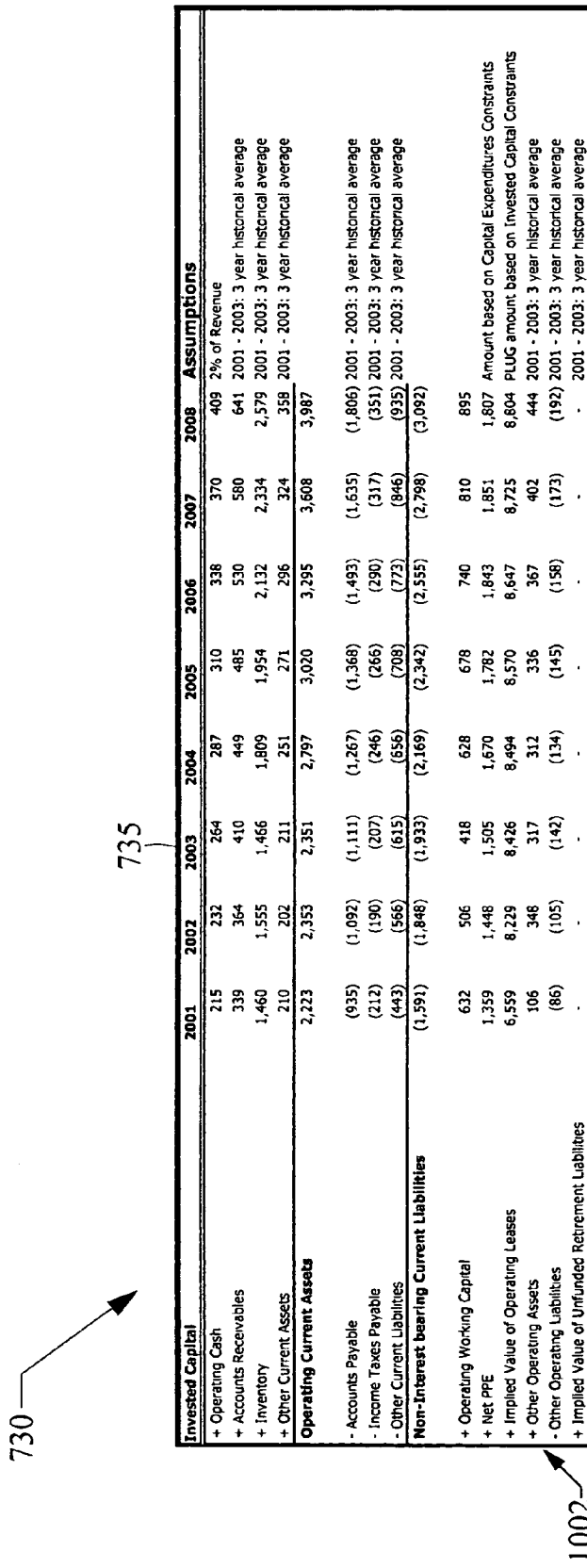
FIG. 10 is another exemplary intermediate report for the analysis tool of FIG. 7.

Referring to FIG. 10, yet another exemplary intermediate report 735 without inputs 732 is shown. In the embodiment of FIG. 10, the report 735 [1000] may include metrics and information for invested capital related calculations. Such information may be provided for both historic and projected financial information. Exemplary invested capital related metrics and information 1002 may include operating cash, accounts receivable, inventory, other current assets, operating current assets, accounts payable, income taxes payable, other current liabilities, non-interest bearing current liabilities, operating working capital, net PPE, implied value of operating leases, other operating assets, other operating liabilities, implied value of unfunded retirement liabilities, net goodwill, invested capital (with goodwill), gross property, plan and equipment, accumulated depreciation, net property, plant, and equipment, depreciation and amortization, and capital expenditures.

Referring to FIG. 11, still another exemplary intermediate report 735 [1100] including metrics and information related to multiple calculations is shown. In the embodiment of FIG. 11, the report 735 [1100] may include historic and projected metrics and information for free cash flow, common stock repurchase, dividends payable, and free cash flow valuation calculations. Exemplary free cash flow related metrics and information 1106 may include NOPLAT, incremental decline in invested capital, and free cash flow. Exemplary common stock repurchase related metrics and information 1108 may include outstanding common shares beginning balance, common shares to repurchase 1102 and associate input 732h, and outstanding common shares ending balance. Exemplary dividends payable related metrics and information 1110 may include dividend payable per quarter share 1104 and associated input 732i, annual dividend payout per share, total dividend payout, and payout ratio as a percentage of free cash flow available. Exemplary free cash flow valuation related metrics and information 1112 may include terminal value, discount rate, discounted cash flow, discounted terminal value, expected firm value, market value of book debt, equity, and expected share price.

Referring to FIG. 12, another exemplary intermediate report 735 [1200] including metrics and information related to multiple calculations without inputs is shown. In the embodiment of FIG. 12, the report 735 [1200] may include TRS targets and FV/CV analysis metrics and information for both historic and projected data. Exemplary TRS target related metrics and information 1202 may include WACC, cost of debt, cost of equity, current market value, projected market value, market value of book debt, ST and LT debt and operating leases, dividends, total TRS in dollars, growth in TRS in dollars, equity share price target, and TRS targets. Exemplary FV/CV analysis related metrics and information 1204 may include market capitalization, projected debt, projected enterprise value, projected current value, projected future value, current value percentage of enterprise value, and future value percentage of enterprise value.

Referring to FIG. 13, another exemplary intermediate report 735 [1300] including metrics and information without inputs is shown. In the embodiment of FIG. 13, the report 735 [1300] may include ratio analysis metrics and information for both historic and projected data. Exemplary ratio analysis metrics and information 1302 may include historical earning, earnings/NOPLAT multiple, revenue/invested capital, capital charge, revenue/capital charge, future value/invested capital, revenue growth, capital growth, spread, economic profit (spread*invested capital), economic profit (NOPLAT−(invested capital*WACC), economic profit check, sustainable growth, future value check, dividends per share, and TRS.

As described above, the processing logic 720 may also generate one or more summary reports 734. Referring to FIG. 14, an exemplary summary report 734 [1400] is shown. In one embodiment, the summary report may include metrics and information for a particular business unit. Alternatively, or in addition, a summary report 734 [1400] may be configured to include performance metrics and information for every business unit being analyzed, such as averages or totals for all business units. Preferably, the summary report 734 [1400] includes both historic and projected metrics and information. Exemplary metrics and information 1402 may include revenue, operating profit (NOPLAT), invested capital with goodwill, return on invested capital, capital turns, projected current value, projected future value, expected share price (free cash flow valuation), price/earnings ratio (P/E), earnings per share (EPS), and TRS.

Additionally, the processing logic 720 may generate one or more visualizations 736a-736n for displaying metrics and information. The system 700 may be configured to show a single visualization at a time, or multiple visualizations may be shown simultaneously. In alternate embodiments, a slide show of visualizations may be presented to a user showing the implementation of alternative strategies or different aspects of the same strategy.

Figure 15:
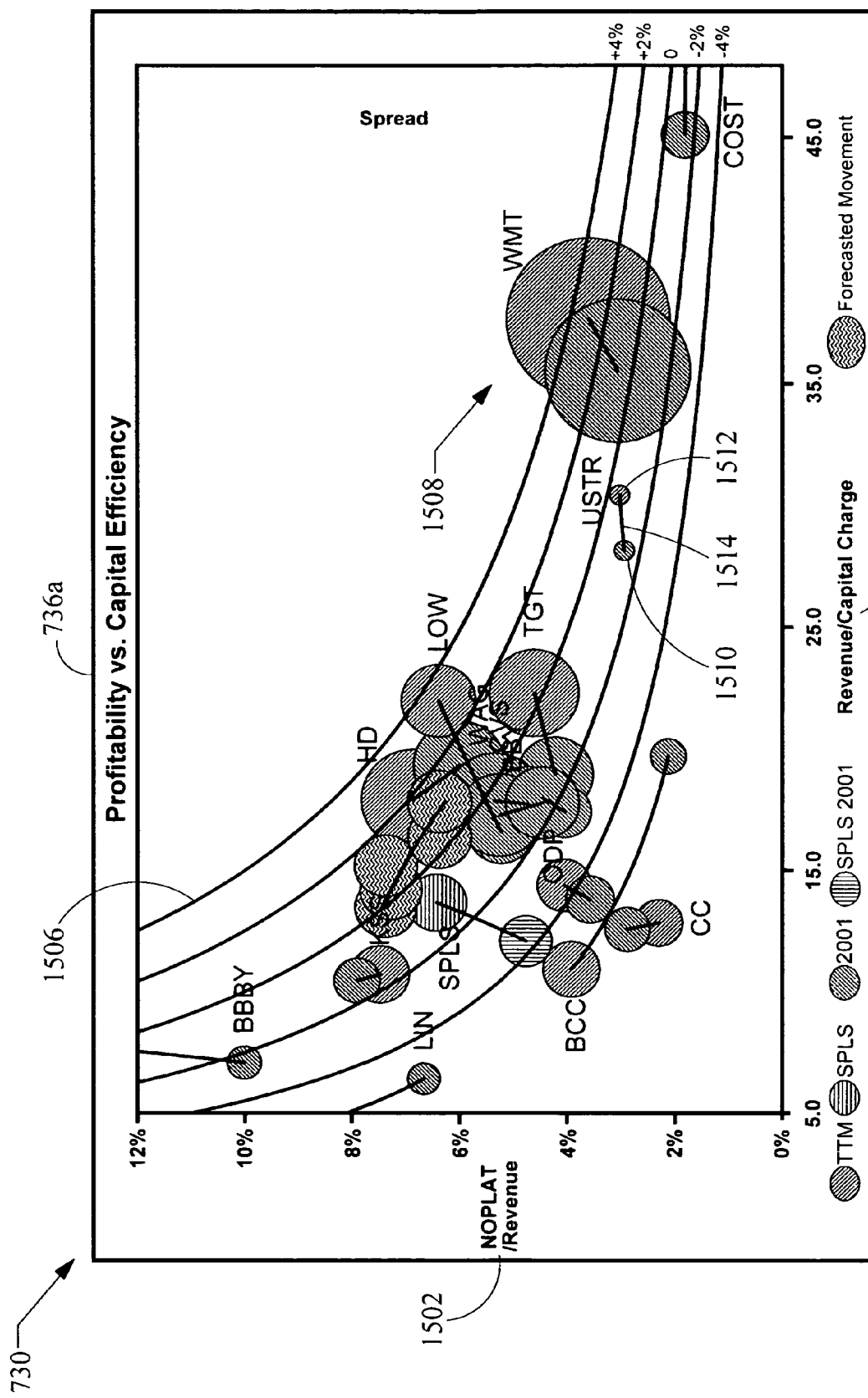
FIG. 15 is an exemplary visualization for the analysis tool of FIG. 7.

Referring to FIG. 15, an exemplary visualization 736a [1500] is shown. In the embodiment of FIG. 15, the processing logic 720 may determine a plurality of data points based on financial data received from various data source 710a-710n. Each data may be associated with a particular business unit, and each business unit may be associated with more than one depicted data point. For example, each business unit may have a corresponding data point depicted for a each time period. For example, data points may be calculated for each business unit for year-end, semi-annually, quarterly, monthly, weekly, or daily time period.

In one embodiment, the visualization may graphically depict the performance of a business unit over five dimensions or data components. Preferably, each data point includes a first component based on the NOPLAT/revenue 1502 metric value for the associated business unit. Additionally, each data point may include a second component based on the revenue/capital charge 1504 metric value for the associated business unit. By plotting a graph using these two components, the visualization 736a [1500] may provide a chart of profitability versus capital efficiency for the associated business unit. These components also enable the visualization 736a [1500] to include indicia 1506 that indicate a spread percentage for the business unit. In one embodiment, the indicia 1506 may include isoquants associated with particular spread percentage values. Optionally, each data point may also include indicia 1508 indicative of the invested capital of the business unit, such as a size, color, or the like associated with the data point.

The visualization 736a [1500] may also include multiple data points for each business unit. For example, data points may be determined for each of a plurality of time periods. In the embodiment of FIG. 15, data point 1510 corresponds to a data point determined at a first time and data point 1512 corresponds to a data point determined at a second time. In such an embodiment, an indicia 1514 indicative of the relationship between the data points of a particular business unit, such as a line or curve connecting the data points, may also be included. Plotting data points for each of a plurality of business units across time and in the manner described above allows an individual to quickly and easily determine trends, strategies, and efficiencies for a particular group of related business units.

Figure 16:
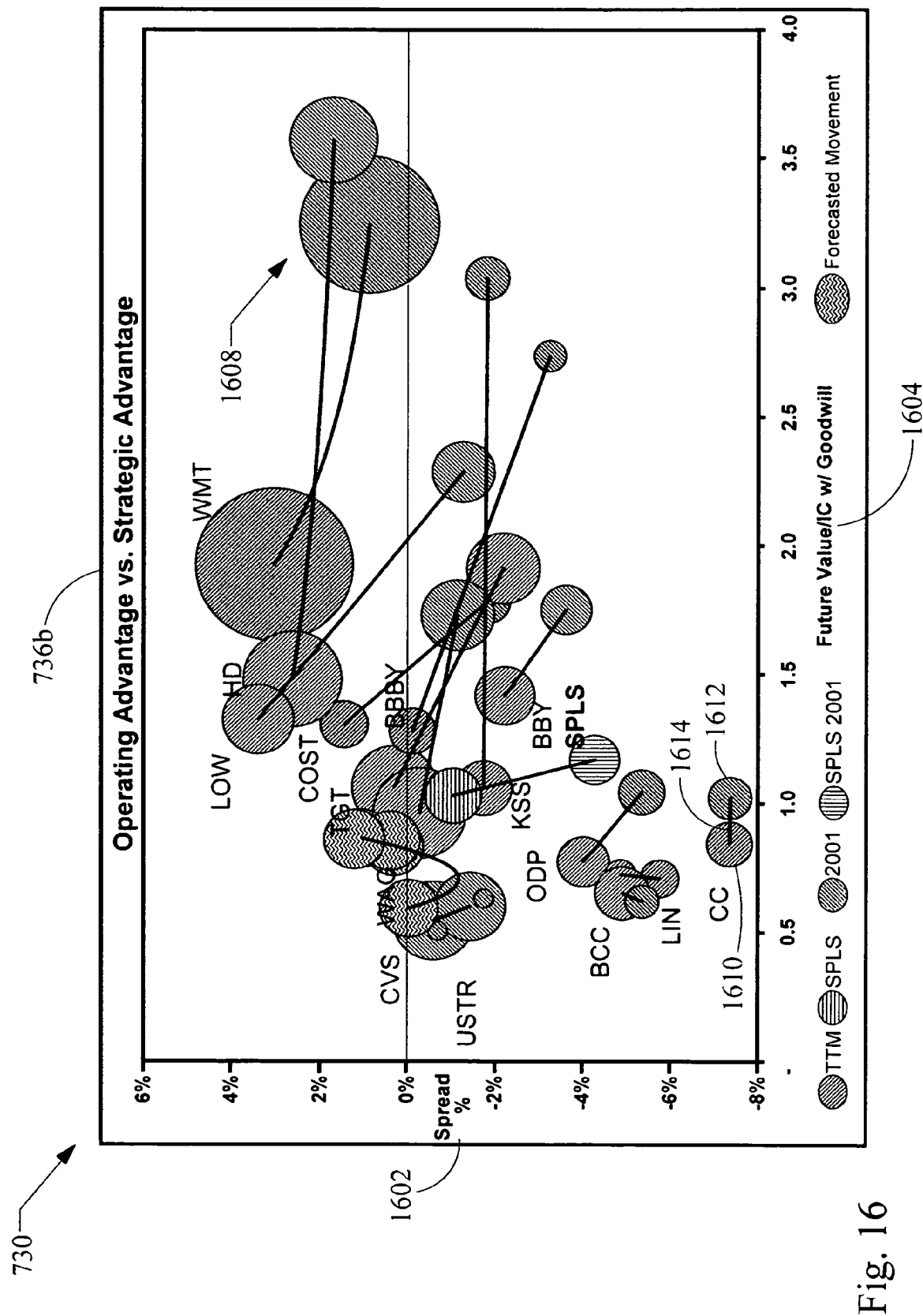
FIG. 16 is another exemplary visualization for the analysis tool of FIG. 7.

Referring now to FIG. 16, another exemplary visualization 736b [1600] is shown. This visualization 736b [1600] is similar to the visualization 736a [1500] of FIG. 15 in many respects, however, is designed to provide operating advantage versus strategic advantage information. First, the visualization 736b [1600] includes a plurality of data points corresponding to performance metrics and information associated with various business units. Each data point includes at least a first and second component. In the embodiment of FIG. 16, the first component is based on the spread percentage 1602 of the business unit, while the second component is based on the ratio of future value over the invested capital plus goodwill of the business unit. Additionally, each data point includes indicia 1608 indicative of the invested capital for the business unit. In one embodiment, multiple data points may be included for each business unit. For example, the visualization 736b [1600] may include a first data point 1610 determined for a first time for the business unit and a second data point 1612 determined for a second time for the business unit. Indicia 1614 may also be included for showing a relationship between the data points 1610 and 1612.

Based on the teachings described herein, others of ordinary skill in the art will appreciate other applications of the system, apparatus and methods in accordance with this invention. Accordingly, it is therefore intended that the foregoing detailed description be regarded as illustrative rather than limiting, and that it be understood that it is the following claims, including all equivalents, that are intended to define the spirit and scope of this invention.

What is claimed is:

1. A system for analyzing the financial performance of a business unit of a company, the system comprising:
- a database having a means for receiving, storing and retrieving financial data about a first business unit and a second business unit different from the first business unit, and having a communications interface for receiving and transferring financial data about the first business unit and the second business unit;
- means for determining Net Operating Profit Less Adjusted Taxes (NOPLAT), revenue, capital charge, spread percentage, and invested capital values for each of the first business unit and the second business unit at least at a first time and a second time from the financial data;
- means for determining at least two data points for the first business unit and the second business unit, respectively, based on the NOPLAT, revenue, capital charge, spread percentage, and invested capital values, each data point including a first component indicative of NOPLAT divided by revenue, a second component indicative of revenue divided by capital charge, and a third component indicative of invested capital, the at least two data points indicative of values determined at one of the first time and the second time, for the first business unit and the second business unit, respectively;
- means for forecasting the NOPLAT, revenue, capital charge, and invested capital values for the first business unit for a third time, said third time being subsequent to said first time and said second time;
- means for determining a third data point for the first business unit based on the forecasted values, the third data point including a first component indicative of NOPLAT divided by revenue, a second component indicative of revenue divided by capital charge, and a third component indicative of invested capital, the third data point indicative of determined values forecasted for the third time;
- at least one display area comprising:
- a user interactive and numerical data display area for receiving a user input and displaying numerical data, wherein the user input comprises commands to input, delete, modify and retrieve financial data from the database, and to select the first business unit and the second business unit;
- a graphical display area for graphically displaying the financial performance of the first business unit and the second business unit comprising: right, left, top and bottom regions; right, left, top and bottom edges that define the border of the graphical display area;
- a vertical axis with a bottom end and a top end corresponding to a low to a high percentage of profitability values from, bottom to top, the profitability values represented by NOPLAT divided by revenue, the vertical axis positioned in the left region of the graphical display area to the right of the left edge of the graphical display area;
- a horizontal axis with a left end and a right end corresponding to a low to a high capital utilization values from left to right, the capital utilization values represented by revenue divided by capital charge, the horizontal axis positioned to intersect at the left end of the horizontal axis with the vertical axis at the point along the vertical axis representing the percentage of profitability value of zero;
- wherein the top end of the vertical axis ends before the top edge of the graphical display area, wherein the bottom end of the vertical axis ends before the bottom edge of the graphical display area, wherein the right end of the horizontal axis ends before the right edge of the graphical display area,
- wherein the vertical axis and the horizontal axis define a boundary of a plot area; and
- a legend area outside the plot area;
- wherein the plot area comprises:
- at least two circles representing the first data point for the first time and the second data point for the second time for each of the first business unit and the second business unit, respectively, wherein the at least two circles are positioned in the plot area to visually indicate the NOPLAT divided by revenue, revenue divided by capital charge, and spread percentage values for the first data point and the second data point for each of the first business unit and the second business unit, respectively, wherein the size of the at least two circles is indicative of the invested capital of the first business unit and the second business unit, respectively, wherein the at least two circles have a unique color or pattern to distinguish the first time from the second time, and wherein a trend line is drawn between the center of the at least two circles for each of the first business unit and the second business unit, respectively;
- a third circle for the first business unit representing the third data point for the third time, wherein the third circle is positioned in the plot area to visually indicate the forecasted NOPLAT divided by revenue, revenue divided by capital charge, and spread percentage values for the first business unit, wherein the size of the third circle is indicative of the invested capital of the first business unit, wherein the third circle has a unique color or pattern to distinguish the third time from the first time and the second time; and
- a plurality of isoquant lines indicative of spread percentage values, wherein the plurality of isoquant lines are positioned in the foreground of the plot area, and the at least two circles and trend lines for the first business unit and the second business unit, respectively, and the third circle for the first business unit are positioned in the background of the plot area.

2. The system of claim 1, wherein the display area is responsive to a user input to modify a forecasted value to cause a visually observed movement of the third data point to a new position depicting a result of the change in the forecasted value.

3. The system of claim 1, wherein the means to receive a user input to modify a forecasted value includes active arrows that increase or decrease the forecasted value, and substantially immediately thereafter graphically display the resulting change of the third data point in the plot area.

4. The system of claim 1, wherein the plot area further comprises labels positioned proximate to the at least two circles and the third circle indicative of the identity of each of the first business unit and the second business unit, respectively.

5. The system of claim 1, further comprising means for receiving an operator input indicative of a growth percentage for at least one value selected from the group consisting of the revenue, NOPLAT divided by revenue, capital charge, and a capital expenditures values for the first business unit or the second business unit for the third time in the future in accordance with the operator input.

6. The system of claim 1, further comprising:

means for forecasting the NOPLAT, revenue, capital charge, and invested capital values for the first business unit for a fourth time, the fourth time being subsequent to the third time;

means for determining a fourth data point for the first business unit from the forecasted values, the fourth data point including a first component indicative of NOPLAT divided by revenue, a second component indicative of revenue divided by capital charge, and a third component indicative of invested capital, the fourth data point indicative of forecasted values for the fourth time;

the plot area further comprising a fourth circle for the first business unit indicative of the fourth data point for the fourth time, and a trend line connecting a center of the third circle to a center of the fourth circle.

7. The system of claim 1, wherein the user interactive and numerical data display area further comprises a navigation tool including a plurality of activatable buttons labeled with identities of business units configured to cause updating the display area with information associated with, the business unit upon activation of a selected button.

8. The system of claim 1, further comprising means for determining the first business unit and the second business unit by a business unit type selected from the group consisting of a company, a product line, a geographical region, a Stock Keeping Unit (SKU), a competitor company, a competitor product line, a competitor geographical region, or a competitor's SKU.

9. A system for analyzing the financial performance of a business unit of a company, the system comprising:

a database having a means for receiving, storing and retrieving financial data about a first business unit and a second business unit different from the first business unit, and having a communications interface for receiving and transferring financial data about the first business unit and the second business unit said third time being subsequent to said first time and said second time;

means for determining spread percentage, future value, and invested capital values for each of the first business unit and the second business unit at least at a first time and a second time from the financial data;

means for determining at least two data points for the first business unit and the second business unit, respectively, based on the spread percentage, future value, and invested capital values, each data point including a first component indicative of spread percentage, a second component indicative of future value divided by invested capital, and a third component indicative of invested capital, the at least two data points indicative of values determined at one of the first time and the second time, for the first business unit and the second business unit, respectively;

means for forecasting the spread percentage, future value, and invested capital values for the first business unit for a third time, said third time being subsequent to said first time and said second time;

means for determining a third data point for the first business unit based on the forecasted values, the third data point including a first component indicative of spread percentage, a second component indicative of future value divided by invested capital, and a third component indicative of invested capital, the third data point indicative of determined values forecasted for the third time;

at least one display area comprising:

a user interactive and numerical data display area for receiving a user input and displaying numerical data, wherein the user input comprises commands to input, delete, modify and retrieve financial data from the database, and to select the first business unit and the second business unit;

a graphical display area for graphically displaying the financial performance of the first business unit and the second business unit comprising: right, left, top and bottom regions; right, left, top and bottom edges that define the border of the graphical display area;

a vertical axis with a bottom end and a top end corresponding to a low to a high spread percentage values from bottom to top, the vertical axis positioned in the left region of the graphical display area to the right of the left edge of the graphical display area;

a horizontal axis with a left end and a right end corresponding to a low to a high future value efficiency values from left to right, the future value efficiency values represented by future value divided by invested capital, the horizontal axis positioned to intersect at the left end of the horizontal axis with the vertical axis at the point along the vertical axis represented by the spread percentage value of zero;

wherein the top end of the vertical axis ends before the top edge of the graphical display area, wherein the bottom end of the vertical axis ends before the bottom edge of the graphical display area, wherein the right end of the horizontal axis ends before the right edge of the graphical display area;

wherein the vertical axis and the horizontal axis define a boundary of a plot area; and a legend area outside the plot area;

wherein the plot area comprises:

at least two circles representing the first data point for the first time and the second data point for the second time for each of the first business unit and the second business unit, respectively, wherein the at least two circles are positioned in the plot area to visually indicate the spread percentage, future value divided by invested capital values for the first data point and the second data point for each of the first business unit and the second business unit, respectively, wherein the size of the at least two circles is indicative of the invested capital of the first business unit and the second business unit, respectively, wherein the at least two circles have a unique color or pattern to distinguish the first time from the second time, and wherein a trend line is drawn, between the center of the at least two circles for the first business unit and the second business unit, respectively; and a third circle for the first business unit representing the third data point for the third time, wherein the third circle is positioned in the plot area to visually indicate the forecasted spread percentage and future value divided by invested capital values for the first business unit, wherein the size of the third circle is indicative of the invested capital of the first business unit, wherein the third circle has a unique color or pattern to distinguish the third time from the first time and the second time.

10. The system of claim 9, wherein the display area is responsive to a user input to modify a forecasted value to cause a visually observed movement of the third data point to a new position depicting a result of the change in the forecasted value.

11. The system of claim 9, wherein the means to receive a user input to modify a forecasted value includes active arrows that increase or decrease the forecasted value, and substantially immediately thereafter graphically display the resulting change of the third data point in the plot area.

12. The system of claim 9, further comprising means to determine an Enterprise Value (EV) of the business unit by subtracting excess cash from a value of market equity plus market debt of the business unit, to determine a current value (CV) of the business unit by dividing the NOPLAT value by a Weighted Average Cost of Capital (WACC) value, wherein the future value is determined by EV minus CV.

13. The system of claim 9, wherein the plot area further comprises labels positioned proximate to the at least two circles and the third circle indicative of the identity of each of the first business unit and the second business unit, respectively.

14. The system of claim 9, further comprising means for receiving an operator input indicative of a growth percentage for at least one value selected from the group consisting of the revenue, NOPLAT divided by revenue, capital charge, and a capital expenditures values for the first business unit or the second business unit for the third time in the future in accordance with the operator input.

15. The system of claim 9, wherein the user interactive and numerical data display area further comprises a navigation tool including a plurality of activatable buttons labeled with identities of business units configured to cause updating the display area with information associated with the business unit upon activation of a selected button.

16. The system of claim 9, further comprising:
  means for forecasting the spread percentage, future value, and invested capital values for the first business unit for a fourth time, the fourth time being subsequent to the third time;
  means for determining a fourth data point for the first business unit from the forecasted values, the fourth data point including a first component indicative of spread percentage, a second component indicative of future value divided by invested capital, and a third component indicative of invested capital, the fourth data point indicative of forecasted values for the fourth time;
  the plot area further comprising a fourth circle for the first business unit indicative of the fourth data point for the fourth time, and a trend line connecting a center of the third circle to a center of the fourth circle.

17. A system for analyzing the financial performance of a business unit of a company, the system comprising:
  a database having a means for receiving, storing and retrieving financial data about a first business unit and a second business unit different from the first business unit, and having a communications interface for receiving and transferring financial data about the first business unit and the second business unit;
  means for determining NOPLAT, revenue, capital charge, spread percentage, invested capital and future value values for each of the first business unit and the second business unit at least at a first time and a second time from the financial data;
  means for determining at least two profitability data points for the first business unit and the second business unit, respectively, based on the NOPLAT, revenue, capital charge, spread percentage, and invested capital values, each data point including a first component indicative of NOPLAT divided by revenue, a second component indicative of revenue divided by capital charge, and a third component indicative of invested capital, the at least two profitability data points indicative of values determined at one of the first time and the second time, for the business unit and the second business unit, respectively;
  means for determining at least two operating advantage data points for the first business unit and the second business unit, respectively, based on the spread percentage, future value, and invested capital values, each data point including a first component indicative of spread percentage, a second component indicative of future value divided by invested capital, and a third component indicative of invested capital, the at least two data points indicative of values determined at one of the first time and the second time, for the first business unit and the second business unit, respectively;
  means for forecasting the NOPLAT, revenue, capital charge, future value, spread percentage and invested capital values for the first business unit for a third time, said third time being subsequent to said first time and said second time;
  means for determining a third profitability data point for the first business unit based on the forecasted values, the third data point including a first component indicative of NOPLAT divided by revenue, a second component indicative of revenue divided by capital charge, and a third component indicative of invested capital, the third data point indicative of determined values forecasted for the third time;
  means for determining a third operating advantage data point for the first business unit based on the forecasted values, the third data point including a first component indicative of spread percentage, a second component indicative of future value divided by invested capital, and a third component indicative of invested capital, the third data point indicative of determined values forecasted for the third time;
  at least one display area on a user interface comprising:
  a user interactive and numerical, data display area for receiving a user input and displaying numerical data, wherein the user input comprises commands to input, delete, modify and retrieve financial data from the database, and to select the first business unit and the second business unit;
  a graphical display area for graphically displaying the financial performance of the business unit comprising: right, left, top and bottom regions; right, left, top and bottom edges that define the border of the graphical display area;
  a first plot area and a second plot area within the display area;
  wherein the first plot area comprises:
  a vertical axis with a bottom end and a top end corresponding to a low to a high percentage of profitability values from bottom to top, the profitability values represented by NOPLAT divided by revenue, the vertical axis positioned in the left region of the graphical display area to the right of the left edge of the graphical display area;
  a horizontal axis with a left end and a right end corresponding to a low to a high capital utilization values from left to right, flue capital utilization values represented by revenue divided by capital charge, the horizontal axis positioned to intersect at the left end of the horizontal axis with the vertical axis at the point along the vertical axis representing the percentage of profitability value of zero;

at least two circles representing of the first profitability data point for the first time and the second profitability data point for the second time for each of the first business unit and the second business unit, respectively, wherein the at least two circles are positioned in the plot area to visually indicate the NOPLAT divided by revenue, revenue divided by capital charge, and spread percentage values for the first data point and the second data point for each of the first business unit and the second business unit, respectively, wherein the size of the at least two circles is indicative of the invested capital of the first business unit and the second business unit, respectively, wherein the at least two circles have a unique color or pattern to distinguish the first time from the second time, and wherein a trend line is drawn between the center of the at least two circles for each of the first business unit and the second business unit, respectively;

a third circle for the first business unit representing the third profitability data point for the third time, wherein the third circle is positioned in the plot area to visually indicate the forecasted NOPLAT divided by revenue, revenue divided by capital charge, and spread percentage values for the first business unit, wherein the size of the third circle is indicative of the invested capital of the first business unit, and wherein the third circle has a unique color or pattern to distinguish the third time from the first time and the second time; and a plurality of isoquant lines indicative of spread percentage values, wherein the plurality of isoquant lines are positioned in the foreground of the plot area, and the at least two circles and trend lines for the first business unit and the second business unit, respectively, and the third circle for the first business unit are positioned in the background of the plot area;

wherein the second plot area comprises:

a vertical axis with a bottom end and a top end corresponding to a low to a high spread percentage values from bottom to top, the vertical axis positioned in the left region of the graphical display area to the right of the left edge of the graphical display area;

a horizontal axis with a left end and a right end corresponding to a low to a high future value efficiency values from left to right, the future value efficiency values represented by future value divided by invested capital, the horizontal axis positioned to intersect at the left end of the horizontal axis with the vertical axis at the point along the vertical axis representing the spread percentage value of zero;

at least two circles representing the first operating advantage data point for the first time and the second operating advantage data point for the second time for each of the first business unit and the second business unit, respectively, wherein the at least two circles are positioned in the plot area to visually indicate the spread percentage, future value divided by invested capital values for the first data point and the second data point for each of the first business unit and the second business unit, respectively, wherein the size of the at least two circles is indicative of the invested capital of the first business unit and the second business unit, respectively, wherein the at least two circles have a unique color or pattern to distinguish the first time from the second time, and wherein a trend line is drawn between the center of the at least two circles for the first business unit and the second business unit, respectively; and a third circle for the first business unit representing a third operating advantage data point for the third time, wherein the third circle is positioned in the plot area to visually indicate the forecasted spread percentage and future value divided by invested capital values for the first business unit, wherein the size of the third circle is indicative of the invested capital of the first business unit, and wherein the third circle has a unique color or pattern to distinguish the third time from the first time and the second time.

18. The system of claim 17, further comprising means to determine an Enterprise Value (EV) of the business unit by subtracting excess cash from a value of market equity plus market debt of the business unit, to determine a current value (CV) of the business unit by dividing the NOPLAT value by a Weighted Average Cost of Capital (WACC) value, wherein the future value is determined by EV minus CV.

19. The system of claim 17, wherein the means to receive a user input to modify a forecasted value includes active arrows that increase or decrease the forecasted value, and substantially immediately thereafter graphically display the resulting change of the third profitability data point in the first plot area and the third operating advantage data point in the second plot area.

20. The system of claim 17, wherein the first plot area further comprises labels positioned proximate to the at least two circles and the third circle indicative of the identity of each of the first business unit and the second business unit, respectively; and wherein the second plot area further comprises labels positioned proximate to the at least two circles and the third circle indicative of the identity of each of the first business unit and the second business unit, respectively.

21. The system of claim 17, further comprising:

means for forecasting the NOPLAT, revenue, capital charge, future value, spread percentage, and invested capital values for the first business unit for a fourth time, the fourth time being subsequent to the third time;

means for determining a fourth profitability data point for the first business unit from the forecasted values, the fourth profitability data point including a first component indicative of NOPLAT divided by revenue, a second component indicative of revenue divided by capital charge, and a third component indicative of invested capital, the fourth profitability data point indicative of forecasted values for the fourth time;

means for determining a fourth operating advantage data point for the first business unit from the forecasted values, the fourth operating advantage data point including a first component indicative of spread percentage, a second component indicative of future value divided by invested capital, and a third component indicative of invested capital, the fourth operating advantage data point indicative of forecasted values for the fourth time;

the first plot area further comprising a fourth circle for the first business unit indicative of the fourth profitability data point for the fourth time, and a trend line connecting a center of the third circle to a center of the fourth circle for the profitability data points; and the second plot area further comprising a fourth circle for the first business unit indicative of the fourth operating advantage data point for the fourth time, and a trend line connecting a center of the third circle to a center of the fourth circle for the operating advantage data points.

22. The system of claim 17, wherein the user interactive and numerical data display area further comprises a navigation tool including a plurality of activatable buttons labeled with identities of business units configured to cause updating the display area with information associated with the business unit upon activation of a selected button.

23. The system of claim 17, further comprising means for receiving an operator input indicative of a growth percentage for at least one value selected from the group consisting of the revenue, NOPLAT divided by revenue, capital charge, and a capital expenditures values for the first business unit or the second business unit for the third time in the future in accordance with the operator input.

24. The system of claim 17, further comprising a means to update the calculated ratios and performance metrics upon receipt of a changed value in an input field and substantially immediately thereafter graph the new data points reflective of the updated ratios and performance metrics.

25. The system of claim 17, further comprising means for determining the first business unit and the second business unit by a business unit type selected from the group consisting of a company, a product line, a geographical region, a Stock Keeping Unit (SKU), a competitor company, a competitor product line, a competitor geographical region, or a competitor's SKU.

* * * * *